(12) United States Patent
Mabey et al.

(10) Patent No.: US 10,067,731 B2
(45) Date of Patent: Sep. 4, 2018

(54) METHOD AND SYSTEM FOR REPRESENTING A SHARED DIGITAL VIRTUAL "ABSOLUTE" CANVAS

(71) Applicant: QuirkLogic, Inc., Calgary (CA)

(72) Inventors: Michael Howatt Mabey, Calgary (CA); Alfonso Fabian de la Fuente, Victoria (CA); Nashirali Samanani, Calgary (CA)

(73) Assignee: QuirkLogic, Inc., Calgary (CA)

( * ) Notice: Subject to any disclaimer, the term of this patent is extended or adjusted under 35 U.S.C. 154(b) by 66 days.

(21) Appl. No.: 15/173,197

(22) Filed: Jun. 3, 2016

(65) Prior Publication Data

US 2017/0192737 A1    Jul. 6, 2017

Related U.S. Application Data

(60) Provisional application No. 62/275,142, filed on Jan. 5, 2016.

(51) Int. Cl.
*G06F 3/14* (2006.01)
*G06F 3/0483* (2013.01)
(Continued)

(52) U.S. Cl.
CPC .......... *G06F 3/1462* (2013.01); *G06F 3/0483* (2013.01); *G06F 3/04842* (2013.01); *G06F 3/04883* (2013.01); *G06F 3/1415* (2013.01); *G06T 3/40* (2013.01); *G06F 2203/04803* (2013.01); *G06F 2203/04807* (2013.01)

(58) Field of Classification Search
None
See application file for complete search history.

(56) References Cited

U.S. PATENT DOCUMENTS 8,090,366 B2    1/2012  McNamara et al.
8,473,851 B2 *  6/2013  DeGrazia .............. G06F 3/0481
                                            715/753
(Continued)

FOREIGN PATENT DOCUMENTS

JP      2015-191487 A    11/2015
TW        201443822 A    11/2014

OTHER PUBLICATIONS

International Search Report issued in corresponding Application No. PCT/CA2016/051538, dated Mar. 17, 2017 (5 pages).
(Continued)

*Primary Examiner* — Jason Pringle-Parker
(74) *Attorney, Agent, or Firm* — Chamberlain Hrdlicka

(57) ABSTRACT

In general, the invention relates to a method for updating content on devices. The method includes detecting a local modification on a device, wherein the local modification is associated with a portion of a locally stored copy of a virtual canvas, wherein the portion of the locally stored copy of the virtual canvas is displayed on the device at a device-scale level, converting the local modification to a second local modification by scaling the local modification from the device-scale level to a system-scale level, updating, using the second local modification, the locally stored copy of the virtual canvas, generating a first update message comprising the second local modification, and transmitting the first update message to a workspace management system.

20 Claims, 29 Drawing Sheets

(51) Int. Cl.
*G06F 3/0484* (2013.01)
*G06F 3/0488* (2013.01)
*G06T 3/40* (2006.01)

(56) References Cited

U.S. PATENT DOCUMENTS

| | | | |
|---|---|---|---|
| 8,826,147 B2 | 9/2014 | Sitrick et al. | |
| 9,575,712 B2* | 2/2017 | Farouki | H04L 12/1822 |
| 9,740,361 B2* | 8/2017 | Tan | G06F 3/0481 |
| 2002/0157880 A1 | 10/2002 | Atwood et al. | |
| 2003/0007683 A1 | 1/2003 | Wang et al. | |
| 2003/0179214 A1 | 9/2003 | Saund et al. | |
| 2005/0091289 A1 | 4/2005 | Shappell et al. | |
| 2006/0028457 A1* | 2/2006 | Burns | G06F 3/03545 |
| | | | 345/179 |
| 2007/0044028 A1 | 2/2007 | Dunn et al. | |
| 2007/0124737 A1 | 5/2007 | Wensley et al. | |
| 2008/0046372 A1 | 2/2008 | Lutnick et al. | |
| 2008/0114844 A1 | 5/2008 | Sanchez et al. | |
| 2008/0123976 A1* | 5/2008 | Coombs | G06T 3/40 |
| | | | 382/238 |
| 2008/0231635 A1 | 9/2008 | Saund | |
| 2009/0019113 A1 | 1/2009 | Wu et al. | |
| 2009/0106093 A1* | 4/2009 | Folgner | G06Q 10/10 |
| | | | 705/14.61 |
| 2009/0273585 A1 | 11/2009 | De Haan et al. | |
| 2010/0257239 A1 | 10/2010 | Roberts | |
| 2012/0131113 A1 | 5/2012 | Chen et al. | |
| 2012/0206330 A1 | 8/2012 | Cao et al. | |
| 2012/0254773 A1 | 10/2012 | Viswanathan | |
| 2013/0091209 A1 | 4/2013 | Bennett et al. | |
| 2013/0091440 A1 | 4/2013 | Kotler et al. | |
| 2013/0321340 A1 | 12/2013 | Seo et al. | |
| 2014/0111416 A1 | 4/2014 | Sugiura | |
| 2014/0222916 A1 | 8/2014 | Foley et al. | |
| 2014/0258901 A1 | 9/2014 | Cho | |
| 2014/0344053 A1 | 11/2014 | Yang et al. | |
| 2015/0109546 A1 | 4/2015 | Tai et al. | |
| 2015/0146985 A1 | 5/2015 | Nakasu et al. | |

OTHER PUBLICATIONS

Written Opinion issued in corresponding Application No. PCT/CA2016/051538, dated Mar. 17, 2017 (4 pages).
International Search Report issued in corresponding Application No. PCT/CA2017/051330, dated Feb. 12, 2018 (3 pages).
Written Opinion issued in corresponding Application No. PCT/CA2017/051330, dated Feb. 12, 2018 (7 pages).
Examination Notification issued in corresponding Taiwan Application No. 103107055, dated Jan. 10, 2018 (23 pages).

* cited by examiner

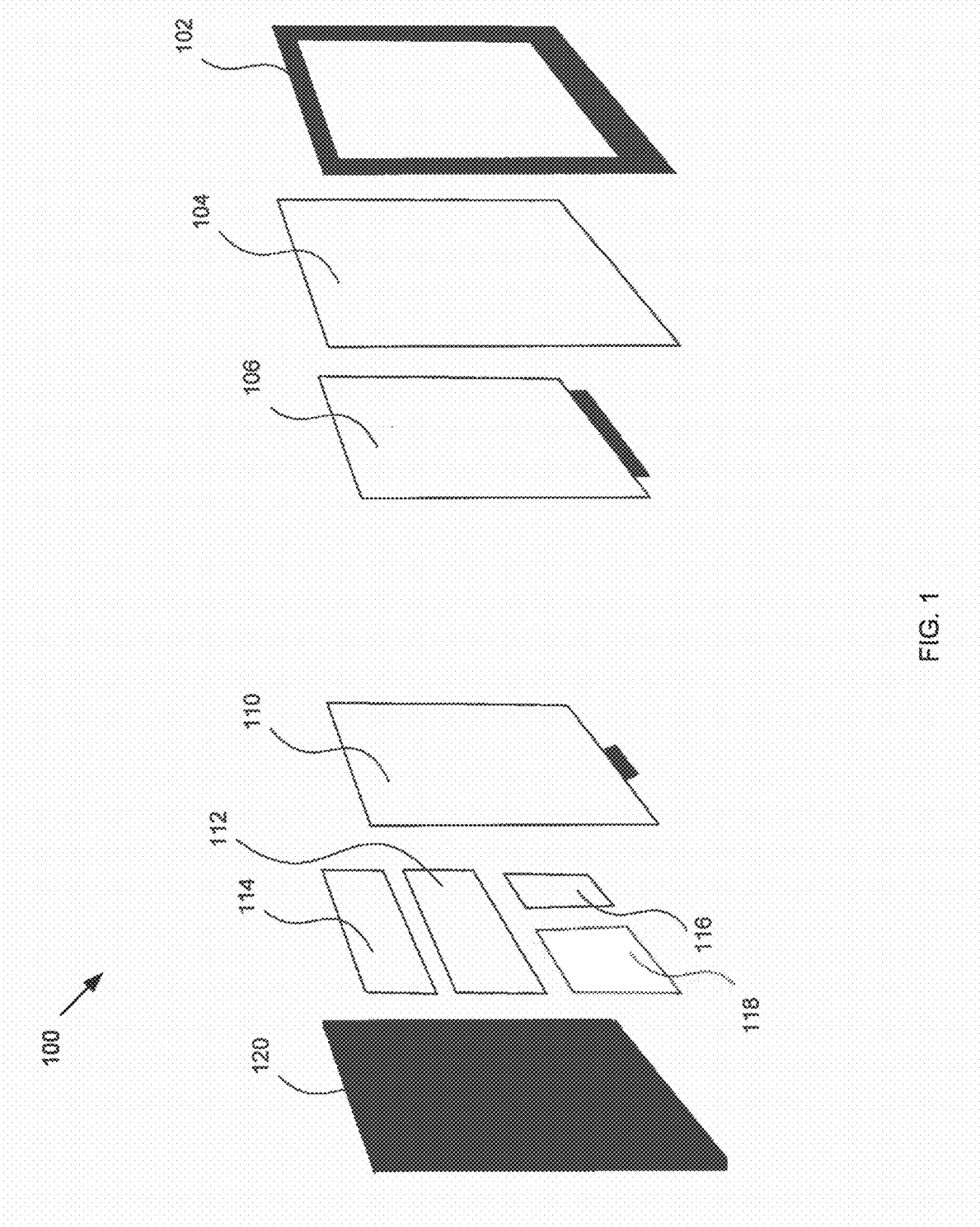

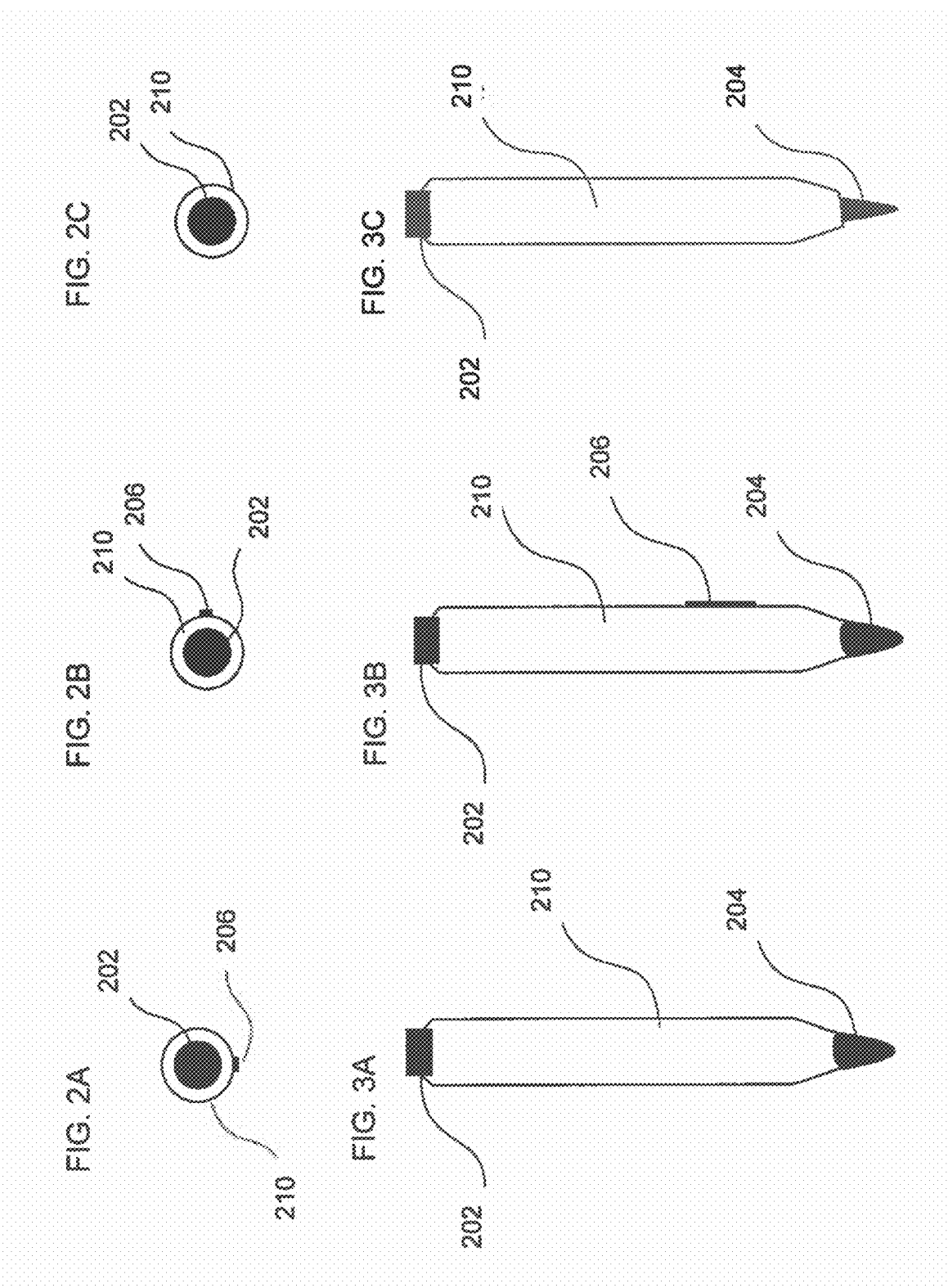

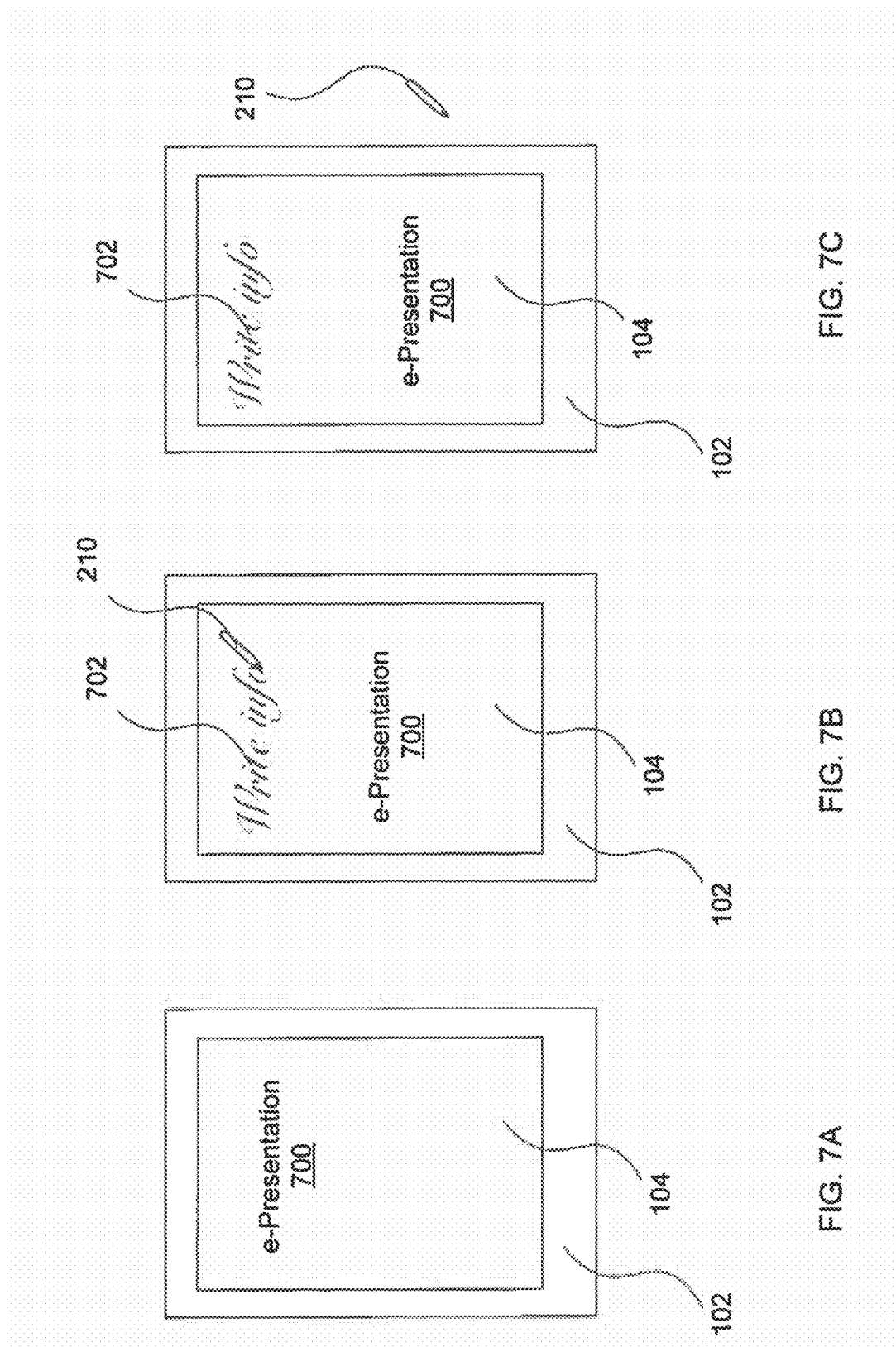

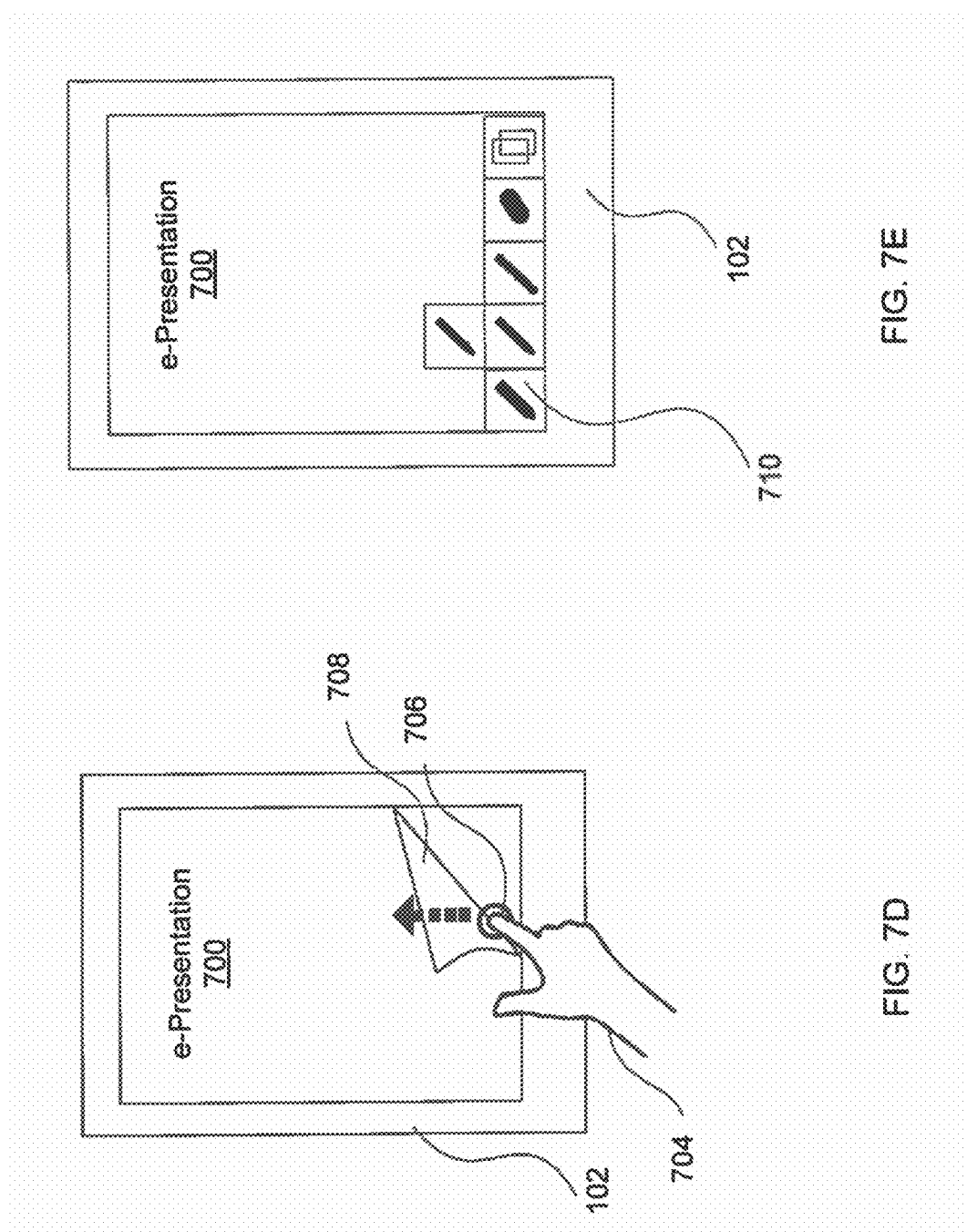

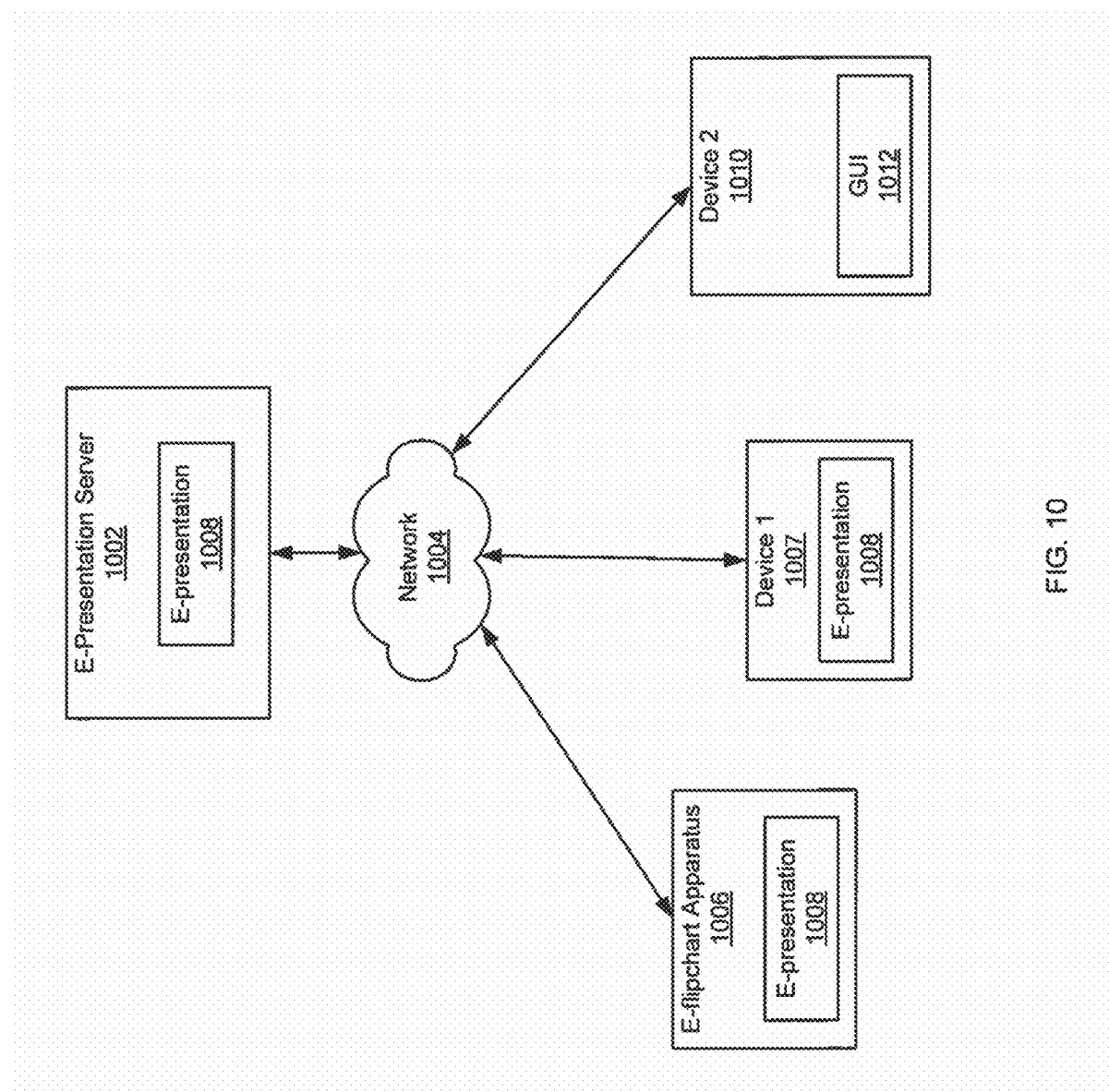

Fig. 22B

| Content Displayed on Device 1 2210 | Content Displayed on Device 2 2212A | Content Displayed on Device 3 2214 | Content Displayed on Device 4 2216A |

Device 4 Scale Level Modification 2218

Fig. 22C

| 2210 | 2212A | 2214 | 2216B |

Device 4 Scale Level Modification 2218

Fig. 22D

| 2210 | 2212B | 2214 | 2216B |

Device 2 Scale Level Modification 2220

METHOD AND SYSTEM FOR REPRESENTING A SHARED DIGITAL VIRTUAL "ABSOLUTE" CANVAS

CROSS-REFERENCE TO RELATED APPLICATIONS

This application claims priority under 35 U.S.C. § 119(e) to U.S. Provisional Patent Application Ser. No. 62/275,142, filed on Jan. 5, 2016, which is incorporated herein by reference in its entirety.

BACKGROUND

Flipcharts have not changed significantly for over 100 years. To this day, it is very common for any meeting room to have some form of a flipchart for writing notes or sharing ideas. Use of the flipchart has been augmented by blackboards and/or whiteboards for presenting information. These tools continue to thrive in the office environment despite the introduction of digital projectors, interactive displays, laptops, and mobile phone technology. Whiteboards and flipcharts are advantageous because they are transparent to users, they are easy to set up and use, and have no technological barriers. Although technology has now advanced in the office environment, whiteboards and flipcharts are fundamentally unchanged.

SUMMARY

In general, in one aspect, the invention relates to a method for updating content on devices. The method includes detecting a local modification on a device, wherein the local modification is associated with a portion of a locally stored copy of a virtual canvas, wherein the portion of the locally stored copy of the virtual canvas is displayed on the device at a device-scale level, converting the local modification to a second local modification by scaling the local modification from the device-scale level to a system-scale level, updating, using the second local modification, the locally stored copy of the virtual canvas, generating a first update message comprising the second local modification, and transmitting the first update message to a workspace management system.

In general, in one aspect, the invention relates to a non-transitory computer readable medium comprising instructions, which when executed by a processor, performs a method, the method includes detecting a local modification on a device, wherein the local modification is associated with a portion of a locally stored copy of a virtual canvas, wherein the portion of the locally stored copy of the virtual canvas is displayed on the device at a device-scale level, converting the local modification to a second local modification by scaling the local modification from the device-scale level to a system-scale level, updating, using the second local modification, the locally stored copy of the virtual canvas, generating a first update message comprising the second local modification, and transmitting the first update message to a workspace management system.

Other aspects of the invention will be apparent from the following description and the appended claims.

BRIEF DESCRIPTION OF DRAWINGS

FIG. 1 shows an apparatus in accordance with one or more embodiments of the invention.

FIGS. 2A-2C show hardware for operating an electronic flipchart in accordance with one or more embodiments of the invention.

FIGS. 3A-3C show hardware for operating an electronic flipchart in accordance with one or more embodiments of the invention.

FIGS. 7A-7F show examples of an electronic flipchart in accordance with one or more embodiments of the invention.

FIG. 10 shows a system for collaboration using an electronic flipchart in accordance with one or more embodiments of the invention.

FIGS. 22A-22D show an example in accordance with one or more embodiments of the invention.

DETAILED DESCRIPTION

Figure 4:
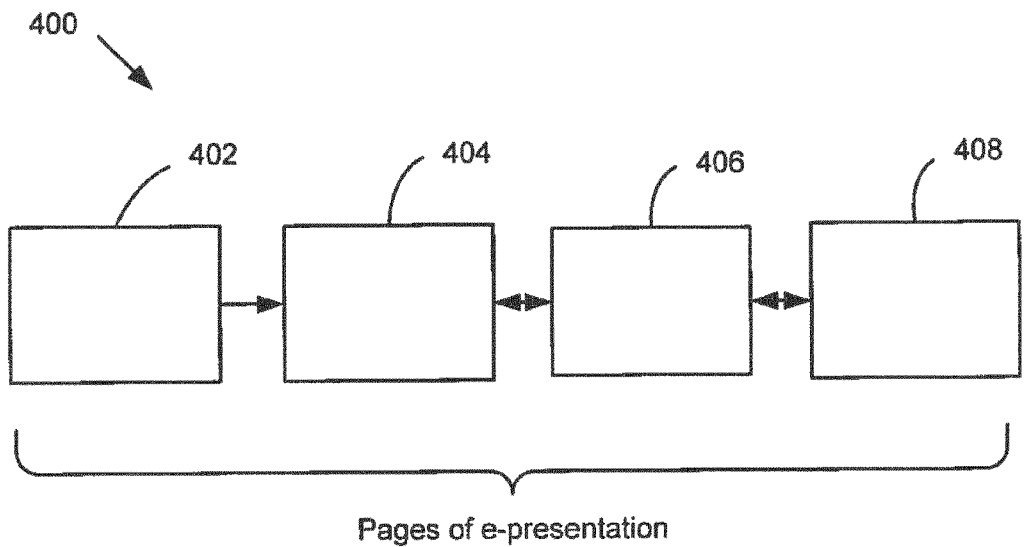
FIG. 4 shows a data structure for an electronic flipchart in accordance with one or more embodiments of the invention.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-24, any components described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method for updating content on interactive devices. More specifically, one or more embodiments of the invention pertain to the scaling of modifications performed on an origin device, associated with one device-scale level, to a system-scale level, to subsequently, different device-scale levels corresponding to the selected portion of content displayed on different target devices. Each of the interactive devices (origin and target devices) may be presenting a portion of a virtual canvas to which each is concurrently accessing.

Interactive devices, as used in embodiments of the present disclosure, may include, for example, e-flipchart apparatuses, smart phones, tablets, laptops, desktop computers, interactive white boards, gaming devices, or any other interactive computing device having a display area or screen for displaying content.

In the description below, FIGS. 1-10 describe one form of an interactive device, i.e., the e-flipchart apparatus, in accordance with embodiments of the invention. The invention is not limited workspaces that only include interactive devices that are e-flipchart apparatuses as described in FIGS. 1-10 below. FIGS. 11-20B are directed to the interaction of multiple interactive devices in a multi-device workspace.

Turning to the FIGS. 1-10, one or more embodiments of the invention are directed to a method and apparatus for an electronic flipchart (herein after referred to as "e-flipchart"). The e-flipchart incorporates a reflective display. The e-flipchart described in embodiments herein may be implemented in a manner that is described as always "on" i.e., ready to use, and includes capability to keep a record of what is drawn or written on the e-flipchart. In one or more embodiments of the invention, the e-flipchart is configured to accept multiple forms of input, e.g., touch input, digital marker input, network input, etc. (see e.g., FIG. 6).

FIG. 1 shows a schematic diagram of an apparatus of an e-flipchart (also referred to as an e-flipchart apparatus) in accordance with one or more embodiments of the invention. While FIG. 1 shows a configuration of components, other configurations may be used without departing from the scope of the invention. For example, various components may be combined to create a single component. As another example, the functionality performed by a single component may be performed by two or more components.

Turning to FIG. 1, in accordance with one or more embodiments of the invention, the apparatus (100) may include one or more hardware elements, each having specific functionality. The main structure of the e-flipchart apparatus is formed between a back panel (120) and a front frame (102). In one or more embodiments of the invention, the front frame is a clear, opaque, or translucent material and includes an active area on which content may be displayed. In one or more embodiments of the invention, the back panel (120) is a rigid mechanical support structure made of a solid material, for example, plastic or metal. In between the back panel (120) and the front frame (102) is a low-power, reflective display (106). In one embodiment of the invention, the reflective display (106) may be viewed as an output device that, through reflection, harnesses ambient light in order to present content. For example, the reflective display (106) may host slow refresh rates, monochromatic coloring (e.g., black and white, or gray scale shading), and the presentation of low contrasting definition. However, on the other hand, the reflective display (106) may have one or more of the following features: (i) very low power consumption; (ii) the readability of content outdoors under sunlight; and (iii) the providing of strain relief on the eyes of a user. As such, in one embodiment of the invention, fundamental static digital media, such as monochromatic text and still images, may be delegated to a reflective display (106) for presentation. Examples of a reflective display include, but are not limited to, a reflective Liquid Crystal Display (LCD), a bi-stable or electrophoretic display (e.g., electronic paper and/or electronic ink displays), an electrochromic display, an electro-wetting or electro-fluidic display, an interferometric modulated display (e.g., a technology that creates color via the interference of reflected light), and an electromechanical modulated display (e.g., Flap Display, digital micro-mirror device).

In one or more embodiments of the invention, at least one portion of the reflective display (106) of the e-flipchart apparatus may be bi-stable. In one embodiment of the invention, the reflective display may correspond to the reflective displayed described in U.S. Pat. No. 5,930,026. The invention is not limited to the reflective display described in the above referenced patent.

Continuing with the discussion of FIG. 1, in front of the reflective display (106) is a layer having at least one touch portion which may be a transparent rigid or semi-rigid board (104), or a frame that uses edge sensors, such as Infra-red or optical sensing technology. In another embodiment, the layer having at least one touch portion (104) may be a capacitive film layer. In one or more embodiments, the layer having at least one touch portion (104) may only cover a portion of the reflective display, with the remaining surface area of the reflective display (106) being covered by non-touch sensitive material which may or may not be clear, opaque, translucent, transparent and/or non-transparent. In the back of the reflective display (106) is an optional electromagnetic layer, which may be an electromagnetic board (110). By combining the electromagnetic layer (110) and the layer having at least one touch portion (104), at least a dual system for touch input is obtained. In one or more embodiments, touch input may include a finger(s) and/or a touch by a digital marker or digitizer.

In one or more embodiments of the invention, the electromagnetic layer (110) is configured to generate an electromagnetic field capable of detecting a digital marker or digitizer (see e.g., FIGS. 2A-3C) when such a tool is used to provide an input to the e-flipchart. The electromagnetic layer (110) includes wires (not shown) that allows the electromagnetic layer (110) to transmit and detect input signals. In one or more embodiments of the invention, the electromagnetic board (110) is configured to determine a position of the touch input (described above) on the e-flipchart by detecting pressure or changes in the generated electromagnetic field caused by a designated portion of the touch input, for example, the tip of a digital marker and/or pressure applied by one or more fingers.

In one or more embodiments of the invention, the front frame (102) includes an active area or region with an active display, and an active input method that includes at least two input capabilities: the ability to detect a digital marker or digitizer and the ability to accept touch input from one or more finger touch points. Further, the apparatus (100) is configured to respond to each detected input type (see e.g., FIG. 6). For example, detecting a digital marker input may result in a line being drawn on the reflective display, while touching the same area with a finger may pan or zoom the display area.

Continuing with FIG. 1, controller (114) includes hardware and software/firmware to control the overall operation of the e-flipchart. More specifically, the controller (114) may include one or more processors (CPUs), persistent storage, and/or volatile memory. Persistent storage may include, for example, magnetic storage, optical storage, solid state storage (e.g., NAND Flash, NOR Flash, etc.), or any combination thereof. Volatile memory may include RAM, DRAM, or any combination thereof. In one or more embodiments of the invention, all or a portion of the persistent storage and/or volatile memory may be removable. In one or more embodiments, the persistent storage may include software instructions for executing operations of the e-flipchart. Specifically, the persistent storage may be configured to store software and/or firmware specific to e-flipchart operations. In one or more embodiments of the invention, the built-in CPU/processors of the controller (114) may execute an operating system and the software which implements e-flipchart functionality.

The controller (including components therein) (114) is powered by a battery and/or a power supply (112). In one or more embodiments, controller (114) is configured to detect and process input signals. For example, when an object touches the layer having at least one touch portion (104), a signal is sent to the controller (114) for detection of the input type and processing of the input. Further, the controller is configured to store e.g., in persistent storage and/or volatile memory, each stroke (in the form of touch input or digital marker) after such an action is performed on the e-flipchart (100) (see e.g., FIG. 6). In other words, the controller (114) is configured to store each stroke or action as it is produced in the active area of the front frame (102) of the e-flipchart apparatus (100). In one or more embodiments of the invention, the controller (114) includes functionality to implement the methods shown and described in FIGS. 6-8. Further, while the controller (114) has been described as a combination of hardware and software, the controller may be implemented entirely within hardware without departing from the scope of the invention.

In one embodiment of the invention, the e-flipchart may include one or more external communication interfaces (116). The communication interfaces permit the e-flipchart to interface with external components. The communication interfaces may implement any communication protocol, for example, Bluetooth, IEEE 802.11, USB, etc. The invention is not limited to the aforementioned communication protocols.

In one or more embodiments of the invention, the apparatus (100) of FIG. 1 is a lower-power reflective device that only draws power from the battery/power supply (112) when there is a screen refresh with new information displayed or when a user is drawing or inputting information in the apparatus. In other words, while the apparatus (100) is "always on" and in a mode that is ready to detect an input, the apparatus is in a low power state. When an input is detected by the apparatus (100) on the active area of the front frame (102), the e-flipchart apparatus is configured to change from the low power state to an active state and perform the methods described in FIGS. 6 and 8.

In one or more embodiments of the invention, the e-flipchart apparatus may be deemed to be in an active state when some or all the components on the e-flipchart apparatus are working accepting pen, touch, keyboard and LAN input, processing applications and/or saving data (and/or metadata) to memory. In the active state, the components of the e-flipchart apparatus are drawing energy from the controller (114). In contrast, the e-flipchart apparatus may be deemed to be in a low power state, (or ready-mode) when no pen, touch, keyboard or LAN inputs are detected (for at least a pre-determined period of time), but the apparatus still shows the last content displayed on it (or displays no content). In ready-mode, CPU processes are minimized, scan rate of finger and pen inputs are delayed and overall power consumption of the components in the e-flipchart apparatus are reduced, for example, by at least 50%. Power consumption may be reduced by a different amount without departing from the invention. For example, only the battery and the controller may be drawing power in ready-mode, reducing the overall power consumption of the e-flipchart apparatus to 40% relative to the power consumption of the e-flipchart apparatus when it is in the active mode. The management of the amount of power that is provided to components of the e-flipchart apparatus and the frequency of polling for input is performed by the controller (114). Specifically, the controller (114) may include an energy management process configured to control the state of various components of the e-flipchart apparatus based on whether the e-flipchart apparatus is in ready-mode or in the active mode.

To contrast the two states of the e-flipchart apparatus, in one or more embodiments of the invention, when the reflective display is in ready-mode, the polling for input occurs at a low frequency, for example, the apparatus may scan for input 2-10 times per second. However, once an input is detected by the apparatus, the apparatus may transition to an active state and increase polling to a higher frequency, e.g., 60-120 times per second, in order to capture all the input that may be occurring on the reflective display. Other polling frequencies may be used in the active state and/or in the ready-mode without departing from the invention.

In one embodiment of the invention, the term "low power state" is intended to convey that the power consumption of the e-flipchart apparatus in this state is relatively lower (or less) than the power consumption of the e-flipchart apparatus in the active state.

Though not shown in FIG. 1, the e-flipchart apparatus may include a camera for detecting certain types of input, e.g., a gesture interpretation.

In one or more embodiments of the invention, the e-flipchart is configured to enable a user to create, modify, store, and share an e-presentation. An e-presentation is described below in FIG. 4.

In one or more embodiments of the invention, the apparatus (100) of FIG. 1 is approximately 42 inches in diagonal with a 3:4 aspect ratio. Those skilled in the art will appreciate that the size of the e-flipchart apparatus is designed to mimic that of a typical paper flipchart; however, the dimensions and size of the reflective display apparatus of FIG. 1 may vary without departing from the scope of the invention.

For example, additional dimensions may include 32" 4:3 aspect ratio for a personal sized flip chart, and 55" or 60" for larger collaborative surfaces. Even larger surfaces may vary the aspect ratio to allow for more usable width, without adding unusable height, such as a 9:16 ratio for an 80" diagonal size.

While FIG. 1 describes an e-flipchart with a series of components organized in particular manner, those skilled in the art will appreciate that the location of such various components in the e-flipchart, in particular, the reflective display (106), the layer having at least one touch portion (104), and the optional electromagnetic layer (110) may be arranged in different order without departing from the invention.

FIGS. 2A-2C shows the hardware for the digital marker or digitizer that may be used as one type of input capable of being detected by the e-flipchart apparatus described in FIG. 1 above. Specifically, FIGS. 2A-2C show a top view of the digital marker in the form of a cylinder (210). The top of the digital marker has an electronic eraser (202) and at least one button (206). In one or more embodiments of the invention, the button (206) is software programmable and, when pressed or otherwise activated, is configured to send one or more signals to the e-flipchart. For example, when the button (206) is pressed or otherwise activated, the button (206) may send a wireless signal that is detected by the e-flipchart. Those skilled in the art will appreciate that the button (206) may be hidden or built into the electronic eraser (202). Further, although only one button is shown in FIG. 2A-2C, the digital marker may include more than one button, where each button is separately programmable. In one or more embodiments, when the electronic eraser (202) comes into contact with the e-flipchart, the e-flipchart is configured to remove or otherwise clear content from the corresponding locations on the reflective display. Said another way, the electronic eraser (202) mimics the operation of a traditional eraser.

FIG. 2B shows a different orientation (i.e., a side view with a zero degree rotation of the cylinder) of the digital marker or digitizer, in which the button (206) is located at the side of the electronic eraser (202) rather than at the bottom of the electronic eraser (202). FIG. 2C shows another top view of the digital marker, in which the cylinder is rotated 90 degrees. In FIG. 2C, the button (not shown) is hidden from view.

FIGS. 3A-3C depict side views of the digital marker or digitizer in accordance with one or more embodiments of the invention. In FIGS. 3A-3C, the entire length of the cylinder (210) form of the digital marker can be seen. In FIG. 3A, on a top end of the digital marker, the electronic eraser (202) is shown. In addition, the tip (204) of the digital marker or digitizer is shown on a bottom end of the cylinder (210). The tip (204) material may be selected such that the tip (204) slides easily over the writing surface. Materials for the tip (204) may include, but are not limited to, high density polyoxyethylene, hard felt, elastomer, polyoxymethylene, polyacetal, or polyoxyethylene. Other materials may be used without departing from the invention.

In one or more embodiments of the invention, the tip (204) of the digital marker may be used to draw or write directly on the active area of the front frame (102) of the e-flipchart apparatus. In FIG. 3B, the button (206) is shown on a side of the cylinder (210) of the digital marker. In FIG. 3C, the tip (204) of the digital marker is shown as being thinner and sharper in comparison with the tip of FIGS. 3A-3B. Those of ordinary skill in the art will appreciate that the tip (204) of the digital marker is a hardware component that may be interchangeable and designed to mimic a pencil, pen, marker, stylus, or any other suitable writing tool having varying widths and sharpness. In FIG. 3C, the button is not shown.

While FIG. 3A-3C show a cylinder shape for the digital marker, those skilled in the art will appreciate that the shape of the digital markers may take other forms without departing from the scope of the invention.

As described above, users of the e-flipchart are able to create, display, store, modify, and share e-presentations. Each e-presentation includes one or more pages organized in a sequential manner. The controller includes functionality to store the information necessary to maintain the e-presentation and allow the user to interact with the e-presentation as described below. An exemplary e-presentation is shown in FIG. 4.

FIG. 4 shows an e-presentation (400) in accordance with one or more embodiments of the invention. The e-presentation may include one or more pages (402, 404, 406 408), where each page represents an electronic page of the e-flipchart. Each page of the e-presentation (400) corresponds to content that may be displayed on the e-flipchart apparatus. In one or more embodiments of the invention, the e-presentation (400) shown in FIG. 4 may be stored in memory or persistent storage associated with the e-flipchart apparatus or in a cloud computing environment to which the e-presentation is backed-up, or any combination thereof. For example, the e-presentation may be stored in persistent storage locally, and mirrored in the cloud environment.

In one or more embodiments of the invention, the e-pages (402, 404, 406, 408) are linked as the e-presentation is populated, in real-time. The link between the pages is represented by the bi-directional arrows shown in FIG. 4. Specifically, the link between pages of the e-presentation and the metadata stored to track the various information associated with the e-presentation is shown in FIG. 5.

Figure 5:
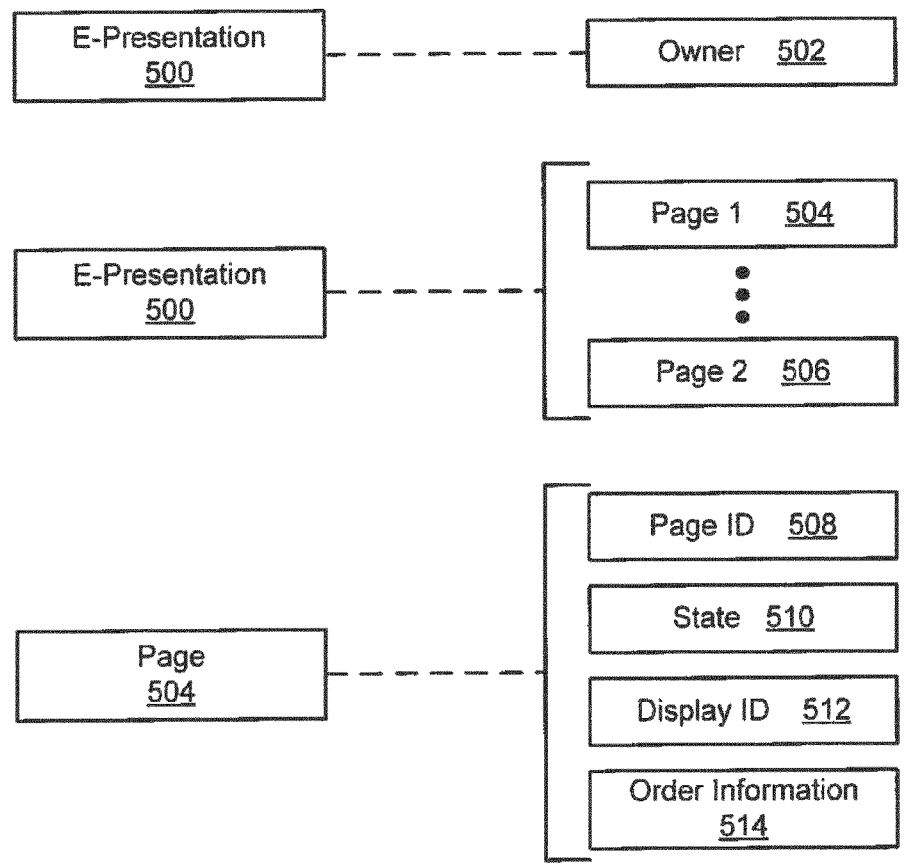
FIG. 5 shows data relationships for an electronic flipchart in accordance with one or more embodiments of the invention.

Specifically, in FIG. 5, each e-presentation (500) may be associated with an optional owner (502). In one or more embodiments of the invention, the owner (502) may be the entity or device on which the e-presentation is initially created. In this case, the owner (502) may be represented by a device ID which identifies the device on which the e-presentation is created. For example, when the e-presentation (500) is created on the e-flipchart apparatus, the owner (502) field may be populated with the local ID of the e-flipchart. Alternatively, the owner (502) may be an individual or group of individuals. In this case, the owner (502) may be represented by one or more user IDs. In one or more embodiments, although not shown, an e-presentation may also have permissions associated with the presentation as a whole, or each page of the e-presentation. Specifically, permissions to read/view/edit an e-presentation may be given by the owner (502) of the e-presentation (500), or by a user of the e-flipchart or other device that is specified as the owner of the e-presentation.

In addition, as shown in FIG. 4 above, the e-presentation (500) may be composed of one or more pages (e.g., Page 1 (504), Page N (506)). Each page (504, 506) is in turn associated with content (data) and metadata. For example, as shown in FIG. 5, page (504) has a page ID (508), a state (510), a display ID (512), and order information (514). The page ID (508) uniquely identifies that page in the e-presentation. The page ID (508) may be numerical, alphabetical, symbolic, or any combination thereof. In one embodiment of the invention, each page may be associated with a state (510). In such embodiments, the state (510) of the page (504) may be, but is not limited to, an active or an inactive state. An active state indicates that page (504) is currently displayed or being written to via the e-flipchart or via another device (see e.g., FIG. 10). An inactive state indicates that page (504) is part of the e-presentation but is not the page that is currently displayed (i.e., the page is not shown) or being written to. Those skilled in the art will appreciate that a page may be associated with other states without departing from the scope of the invention, such as for example, an edit state in which the page is being edited offline, or an offline state in which the page is linked to the e-presentation but is offline or stored in persistent memory.

In one embodiment of the invention, each page may be associated with a display ID (512). In such embodiments, the display ID (512) associates the page (504) with a display device. For example, in a scenario in which the page (504) is displayed on the e-flipchart, the display ID may be the ID of the e-flipchart. In an alternate embodiment, suppose page (504) is linked to an e-presentation currently being modified on the e-flipchart, but is not the active page of the e-presentation. In this case, the page (504) may be shared with a second device over a network, so that the owner of the second device may edit the page (504) (see e.g., FIGS. 9A-9C, 10). In this scenario, the display ID (512) associated with the page (504) is the ID of the second device on which the page (504) is being edited. Accordingly, the display ID (512) of a page (504) linked to an e-presentation may change at any time. In one or more embodiments, there may be multiple display IDs (512), each one corresponding to a device that is currently viewing the page (504). Further, in one or more embodiments, the display ID may only be assigned when the state of a page is active. When the state of page is inactive, the display ID field in the data structure of the e-presentation may be null.

In one or more embodiments of the invention, the order information (514) of a page (504) links the page (504) to other pages in the e-presentation in a specific order and indicates how the pages of an e-presentation may be traversed. Specifically, the e-flipchart apparatus mimics use of a typical paper flipchart apparatus, in which a new page is obtained by flipping a current page over the flipchart apparatus. In the typical flipchart apparatus, the pages are flipped in an order, such that pages cannot be skipped to obtain a particular page of the e-presentation. Similarly, with the e-flipchart apparatus, each page (504) of the e-presentation may be linked to at least one page prior to the page (504) and at least one page following the page (504) in the e-presentation. In one or more embodiments of the invention, the order information (514) may include the page IDs of at least the page prior to the page (504) and the page following the page (504). Those skilled in the art will appreciate that the controller may facilitate skipping to a page out of order without departing from the scope of the invention.

In one or more embodiments of the invention, the metadata associated with an e-presentation, as shown in FIG. 5, may be populated and stored into a data structure as the e-presentation is created and modified. The data structure may then be stored locally in the e-flipchart apparatus persistent storage, or in a cloud computing environment. A specific example of how the data structure is populated is described in FIG. 8 below.

Figure 6:
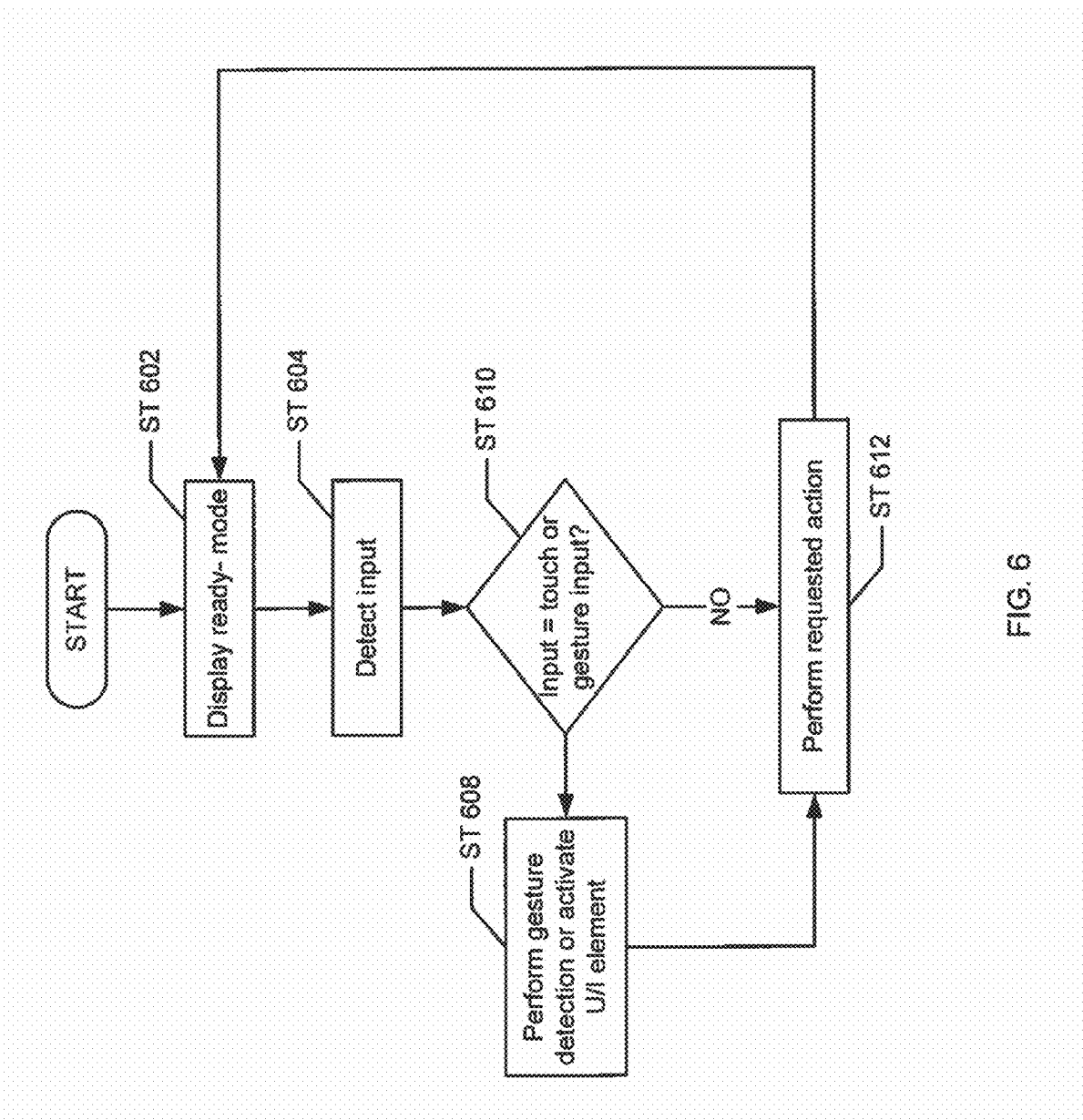
FIG. 6 shows a flowchart in accordance with one or more embodiments of the invention.

FIG. 6 shows a flow chart in accordance with one or more embodiments of the invention. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

In Step 602, the e-flipchart apparatus is in display ready-mode. As described above, the e-flipchart apparatus may be always "on," and therefore, ready for use when a user walks up to the apparatus or provides another type of input that is detected by the apparatus (Step 604). Specifically, in the ready-mode (or base state), the e-flipchart apparatus polls for an input at a low frequency or input scan rate. In this mode, the display area of the e-flipchart apparatus may include the image from the last time it was fully active. When an input is detected, the apparatus changes state from ready-mode to the active state. For example, in one or more embodiments of the invention, when input is sensed by the electromagnetic board, a signal is sent to a controller CPU which is running the energy management software to "wake up" some or all the components and put them in "active mode". The same process occurs when a signal is detected via a GUI, touch input, or in a "wake up on LAN" input.

The input detected by the e-flipchart apparatus in Step 604 may be a wireless input provided by the press of a button, such as a Bluetooth signal, radio frequency signal, or other wireless network signal, a digital marker input, a touch input, a gesture input, or any other suitable type of input. Based on the type of input detected, a specific action may be performed by the e-flipchart apparatus. Thus, upon detection of an input, a determination is made as to whether the input is a touch input or a gesture input (Step 606). If the detected input is a user gesture, the e-flipchart apparatus may be configured to perform gesture detection or activate a user interface (UI) component (Step 608). For all other input types, an appropriate action is performed by the e-flipchart apparatus (Step 610). For example, when the detected input is not a touch or gesture input, but rather, is a wireless signal, for example, a press of the button on the digital marker, corresponding external events may be activated (Step 610). For example, in Step 610, when the input is a Bluetooth signal, the e-flipchart apparatus may be configured to activate a peripheral device or external Bluetooth receiver. External event inputs may also be, in one or more embodiments of the invention, proximity sensors, motion sensors, sound sensors that detect sound above a particular decibel threshold, etc., for detecting the presence of one or more people close to or in the vicinity of the e-flipchart apparatus. For example, proximity sensors may include ultrasonic sensors or infrared sensors. In yet another embodiment of the invention, when the detected input is a pen stroke using a digital marker or digitizer, the e-flipchart apparatus may be configured to detect the path of the digital marker tip and convert the motion to a display of simulated ink strokes (Step 612). Accordingly, the specific action performed by the e-flipchart may vary depending on the type of input received.

When the detection input is a gesture or a touch input, the activated components may display data on the display area, flip a page, zoom into the content displayed, or perform any other suitable action in response to the touch/gesture input. In one or more embodiments of the invention, after performing the action in response to the detection of an input, the e-flipchart apparatus returns to the base state of "ready-mode." In one or more embodiments, in this mode the e-flipchart apparatus is to continue to display an image without any power used by the bi-stable reflective display component of the apparatus. Examples of the types of actions that may be performed are described below in FIGS. 7A-7E.

Specifically, in one or more embodiments of the invention, FIG. 7A shows an example front frame (102) of an e-flipchart apparatus. The front frame (102) mimics a screen and has an area which is capable of accepting at least two type of input: touch and digital marker. When one of the aforementioned types of input is detected, for example in the active region or display area of the layer having at least one touch portion (104), an e-presentation (700) is created and displayed. Specifically, when a user walks up to the e-flipchart apparatus in ready-mode and provides an input, the e-presentation (700) is created. Creation of the e-presentation may include generating and populating the data and metadata shown in FIG. 5. In FIG. 7A, the display area is blank. In FIG. 7B, an example input of writing (702) using a digital marker (210) on the active area of the e-flipchart apparatus is shown. Specifically, in FIG. 7B, when the tip of the digital marker or digitizer (210) is pressed onto the active area of the e-flipchart apparatus, the path of the digital marker (210) is detected and converted by the software of the e-flipchart apparatus into simulated ink strokes (702) which are displayed on a first page of the e-presentation (700). FIG. 7C shows at least one embodiment in which the displayed stroke images are maintained on the e-flipchart apparatus without any power consumption by the reflective display component of the e-flipchart apparatus. In one or more embodiments of the invention, the reflective display displays the latest information that resulted from input to the e-flipchart, and does not change until new input is received by the controller.

In FIG. 7D, a touch input (704) is detected by the e-flipchart apparatus. In the example shown, a user touches the display screen (706) and, in one or more embodiments, moves his/her finger in an upward motion (indicated by the arrow pointed upward), resulting in the current page (708) flipping over to begin a new page of the e-presentation (700). Those skilled in the art will appreciate that a page may be flipped using a gesture input as well, in addition to or instead of a touch display as shown in the example of FIG. 7D. For example, a visual gesture (e.g., movement of a hand in a particular path without touching the e-flipchart) which may be detected by the camera and that is interpreted as a page flip may result in the software interpreting the flip gesture as a page flip action. A page flip action results in transitioning from a current page to another page of the e-presentation. In FIG. 7E, a graphical user interface (GUI) (710) is displayed on the screen of the e-flipchart apparatus. The GUI (710) may be invoked by the pressing of a button on the digital marker, by a gesture, or by any other designated input. In one or more embodiments of the invention, the GUI (710) may be invoked from a menu on a secondary screen that is, for example, connected to a cloud server by a bi-directional communication channel. In one or more embodiments, the GUI (710) may be used to select particular features or perform selected actions such as, for example, sharing the current page of an e-presentation, selecting an eraser, changing the font, style, or color of the displayed line strokes, etc.

Figure 7F:
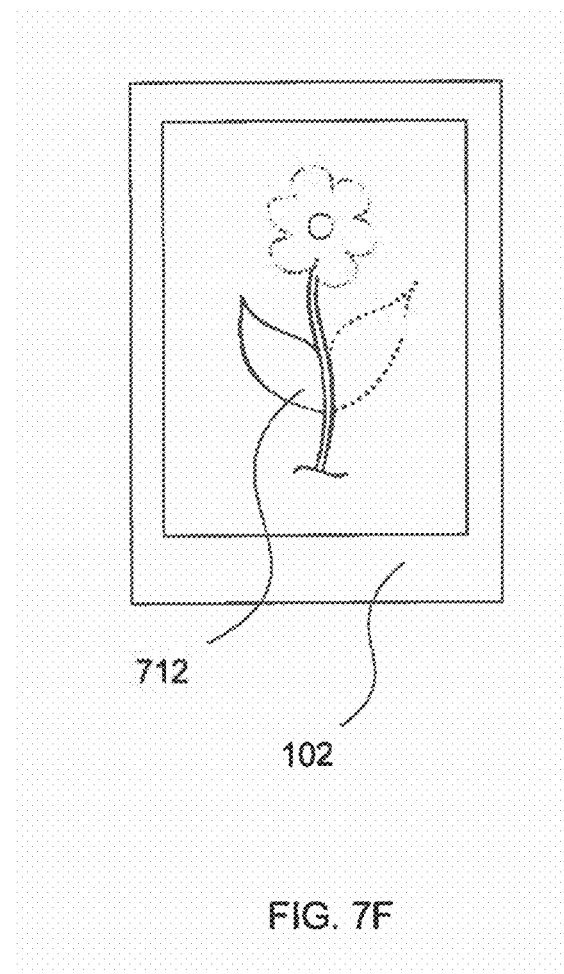

FIG. 7F shows an example of an e-presentation having a drawing. In one or more embodiments of the invention, as shown in FIG. 7F, the e-flipchart apparatus may display a pencil skeleton image (712) to aid a user in creating an e-presentation. The pencil skeleton may provide a light image so that a user may, at a later time, trace the light pencil drawing with a marker to draw a predetermined object. This feature may be used, for example, to create an illusion that the user is creating artwork on the fly. Although FIG. 7F shows a pencil skeleton of a flower, those of ordinary skill would appreciate that the pencil skeleton may depict any object, or may more generally provide any type of aid for writing or drawing. For example, the pencil skeleton may be a combination of light horizontal and vertical lines mimicking graph paper or notebook paper.

Figure 8:
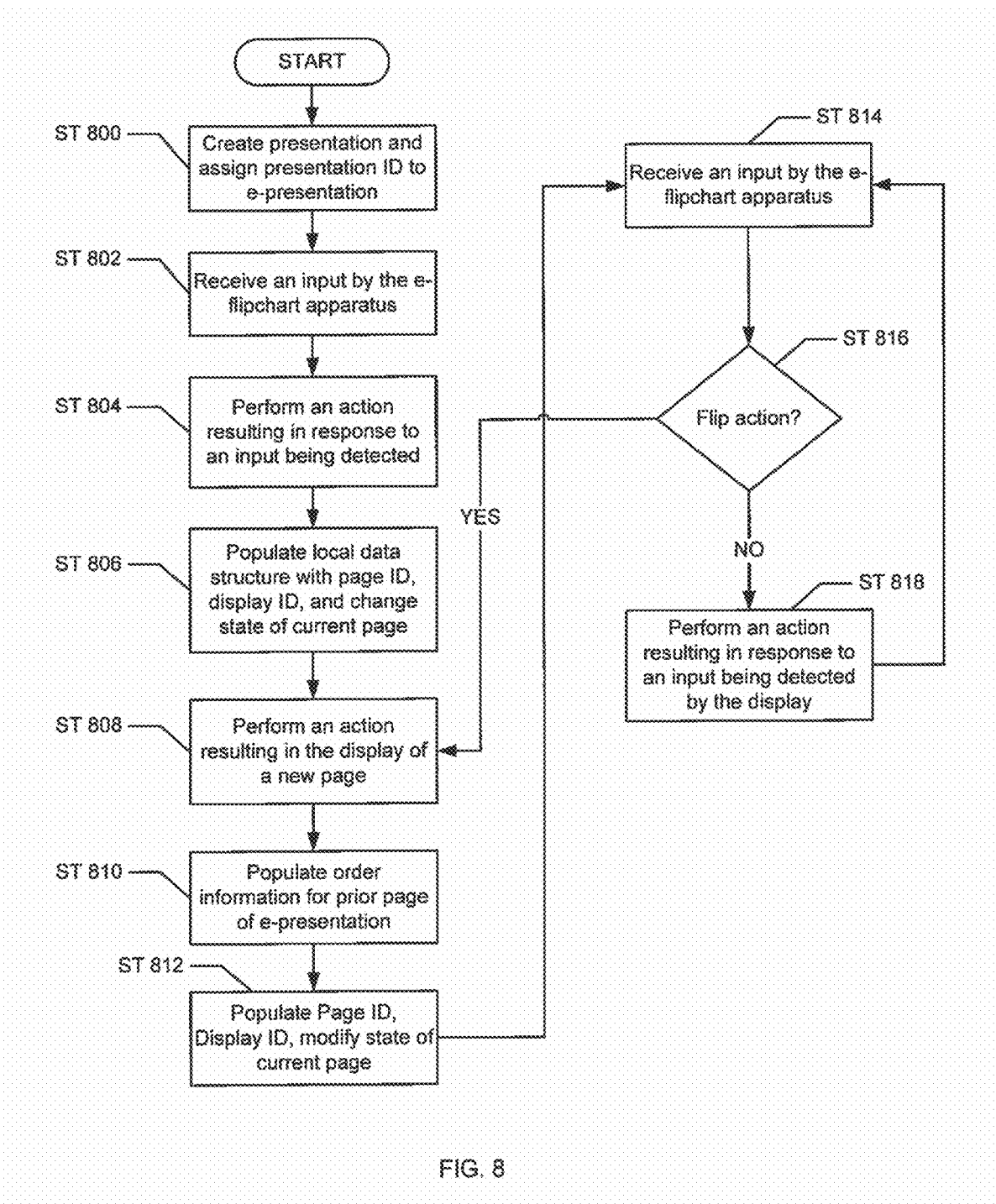
FIG. 8 shows a flowchart in accordance with one or more embodiments of the invention.

FIG. 8 shows a flow chart in accordance with one or more embodiments of the invention. Specifically, FIG. 8 shows a flowchart for creating and maintaining an e-presentation in accordance with one or more embodiments of the invention. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In step 800, an e-presentation is created and associated with a presentation ID. In one or more embodiments of the invention, the presentation ID may be assigned by an e-presentation server, or alternatively, may be generated by the e-flipchart or provided in response to an input prompt to the user. The e-presentation server may be a remote server that is connected to the e-flipchart apparatus via a network. The functionality and purpose of the e-presentation server is described below in FIG. 10. The presentation ID may be a numerical ID, alphabetical ID, a symbolic ID, or any combination thereof, and is configured to uniquely identify the e-presentation displayed on the e-flipchart apparatus. When an e-presentation is initially created, it may not contain any content. Further, if the e-flipchart apparatus does not receive any user input within a certain period of time, the e-flipchart apparatus may transition to ready-mode. In one embodiment of the invention, step 800 may be performed when the e-flipchart apparatus is in either ready mode or active mode.

In Step 802, an input is detected by the e-flipchart apparatus in ready-mode. In ready-mode, the apparatus is scanning for input at a low frequency, e.g., twice per second. As described above, the input detected by the reflective display may be a touch input, a digital marker input, a proximity sensor input (e.g., when a user approaches the e-flipchart apparatus), a network signal, or any other suitable type of input. As described above, when an input is detected, the apparatus changes state from ready-mode to the active state. For example, in one or more embodiments of the invention, when input is sensed by the electromagnetic board, a signal is sent to the controller CPU which is running the energy management software to "wake up" some or all the components and put them in "active mode". The same process occurs when a signal is detected via a GUI, touch input, or in a "wake up on LAN" input. Step 802 may also be performed when the e-flipchart apparatus is in active mode.

In step 804, an action is performed in response to the received input. For example, the corresponding action may be to activate one or more components of the e-flipchart apparatus, convert input strokes to display rendered stroke images, display a GUI, share information with another device, etc. In one or more embodiments of the invention, when the input is received via a digital marker on the surface of the apparatus, the apparatus may identify a tip width of the digital marker via various methods. For example, the electromagnetic board may detect the tip width of the digital marker. Alternatively, the layer having at least one touch portion may be configured to detect the tip width of the digital marker. In yet another embodiment, the digital marker may transmit a signal to the apparatus that includes information about the tip width. In one or more embodiments of the invention, using information about the tip width associated with the input received, the apparatus may be configured to display a certain line width for rendered strokes.

In Step 806, a data structure (shown in FIG. 5, for example) for storing metadata associated with the e-presentation is populated with a page ID and a display ID. In addition, the state of the current page with the page ID is changed to active. In one or more embodiments of the invention, the data structure may be populated and stored locally, in the memory associated with the e-flipchart apparatus, or may be stored remotely, for example, in an e-presentation server or cloud computing environment. If the data structure is stored locally, the data structure may be backed-up (e.g., mirrored) on a remote server or in the cloud computing environment. At this stage, various actions may be performed resulting in writing or drawing on the current page. In step 808 an input resulting in display of a new page may be detected. For example, a touch input or gesture which results in a page flip.

In step 810, when a second page is created as part of the e-presentation, the data structure is populated with order information, linking the first page to the new second page in the e-presentation. In step 812, the new page of the e-presentation may be assigned its own page ID, following that of the first page ID, and display ID. In addition, the state of the first page is changed to inactive, and the state of the current page, i.e., the second page, is changed to active. In step 814, input is received by the e-flipchart apparatus.

In step 816, a determination is made as to whether the input received in Step 814 is a page flip action. If a page flip action is detected, the method proceeds to Step 808 and the data structure continues to populate itself with a third page ID and ordering information for the second page is updated to reflect the link to the third page. This process may repeat each time a page flip action is detected by the e-flipchart apparatus. Alternatively, if no page flip action is detected, then the process proceeds to step 818. In step 818, an action corresponding to the input received is performed. In one embodiment of the invention, the process may not end (i.e., various steps in FIG. 8 may be repeated), because the e-flipchart apparatus does not turn "off." Rather, when input is not detected for a predetermined amount of time, the e-flipchart apparatus returns to "ready-mode" and waits for an input (Step 814).

Figures 9A, 9B:
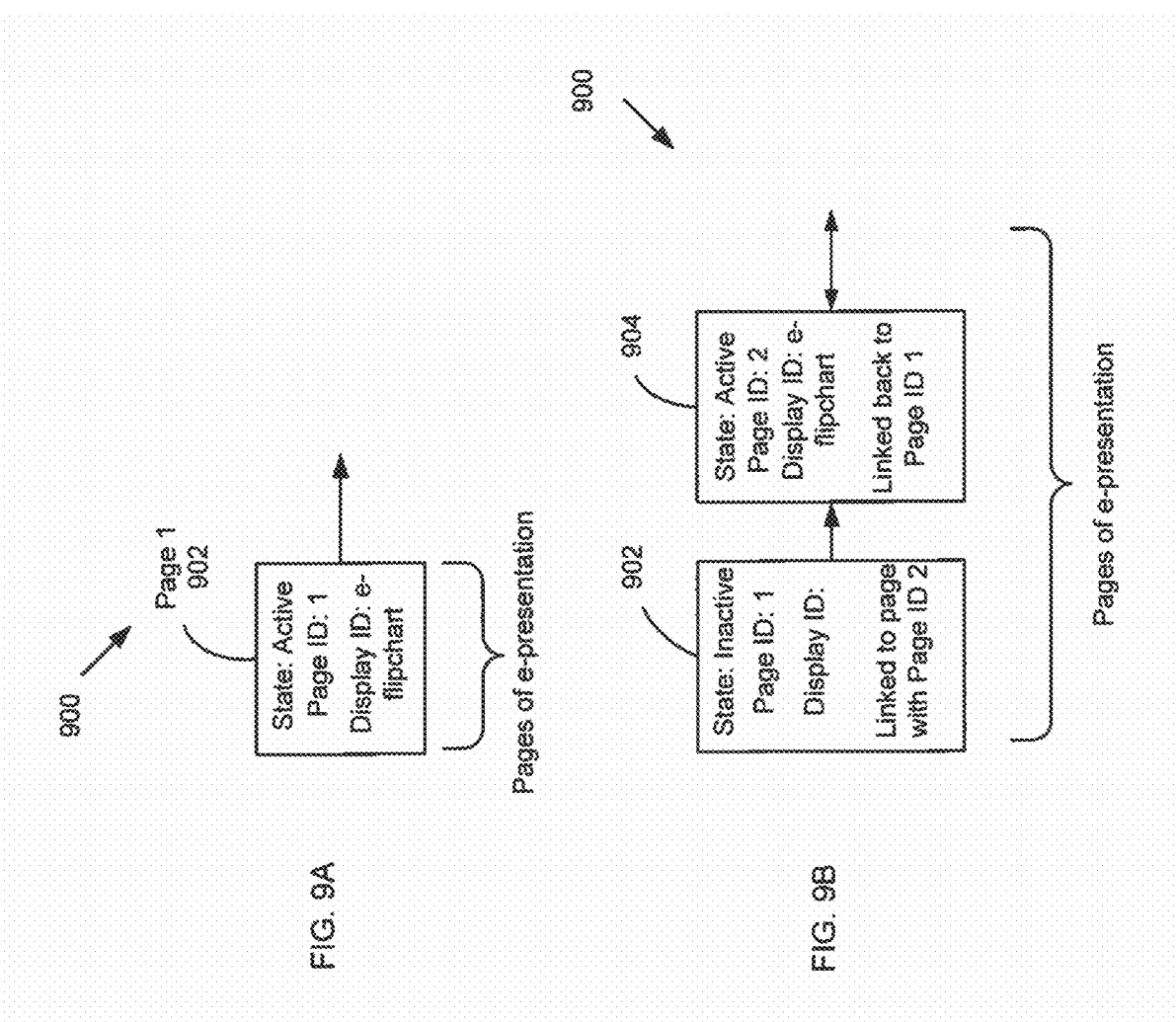
FIGS. 9A-9C show examples of storing data for an electronic flipchart in accordance with one or more embodiments of the invention.

FIGS. 9A-9E show examples of the method described in FIG. 8 above in accordance with one or more embodiments of the invention. In FIG. 9A, consider a scenario in which an e-presentation is created by the e-flipchart apparatus. At some point after the e-presentation is created, assume that a user walks up to the e-flipchart apparatus and provides an input in the form of pressing a button on or writing with a digital marker. Once the input is detected, the action associated with the input is interpreted and, in this example, result in content being associated with the first page (902) of the e-presentation. The first page (902) (i.e., the page on which characters are written, for example) is displayed on the active area of the e-flipchart apparatus with a white background. At this stage, the data structure (900) which stores metadata associated with the e-presentation begins to be populated with metadata. As shown in FIG. 9A, the metadata associated with page 1 (902) includes the state of active, a page ID of 1, and a display ID that identifies the e-flipchart apparatus. The owner ID of the e-presentation may also be the ID of the e-flipchart apparatus, or may be null for purposes of this example. Those skilled in the art will appreciate that no order information exists for a single page e-presentation.

Now suppose the user gestures or provides a touch input which the software of the e-flipchart apparatus interprets as a page flip action. As shown in FIG. 9B, a second page is added to the e-presentation, and the metadata for both page 1 (902) and page 2 (904) is updated/populated in the data structure (900). Specifically, the state of page 1 (902) becomes inactive as it is no longer the page that is displayed. Further, the display ID field of page 1 (902) is updated to null. Order information is added to page 1 (902) linking the page to the second page (904) in order. For page 2 (904), an active state is retained, a new page ID is assigned and the display ID is updated to be the ID of the e-flipchart apparatus. Order information for page 2 (904) is populated to reflect that page 2 (904) is linked to page 1 (902). More specifically, page 2 (904) comes after page 1 (904). The order information becomes important when a page flip action is performed. Specifically, during normal operation, because the e-flipchart apparatus mimics a traditional paper flipchart, pages must be flipped in order (i.e., when using the page flip action, one cannot jump from page 1 to page 4, for example, without also flipping pages 2 and 3, although pages may be flipped in groups).

Figure 9C:
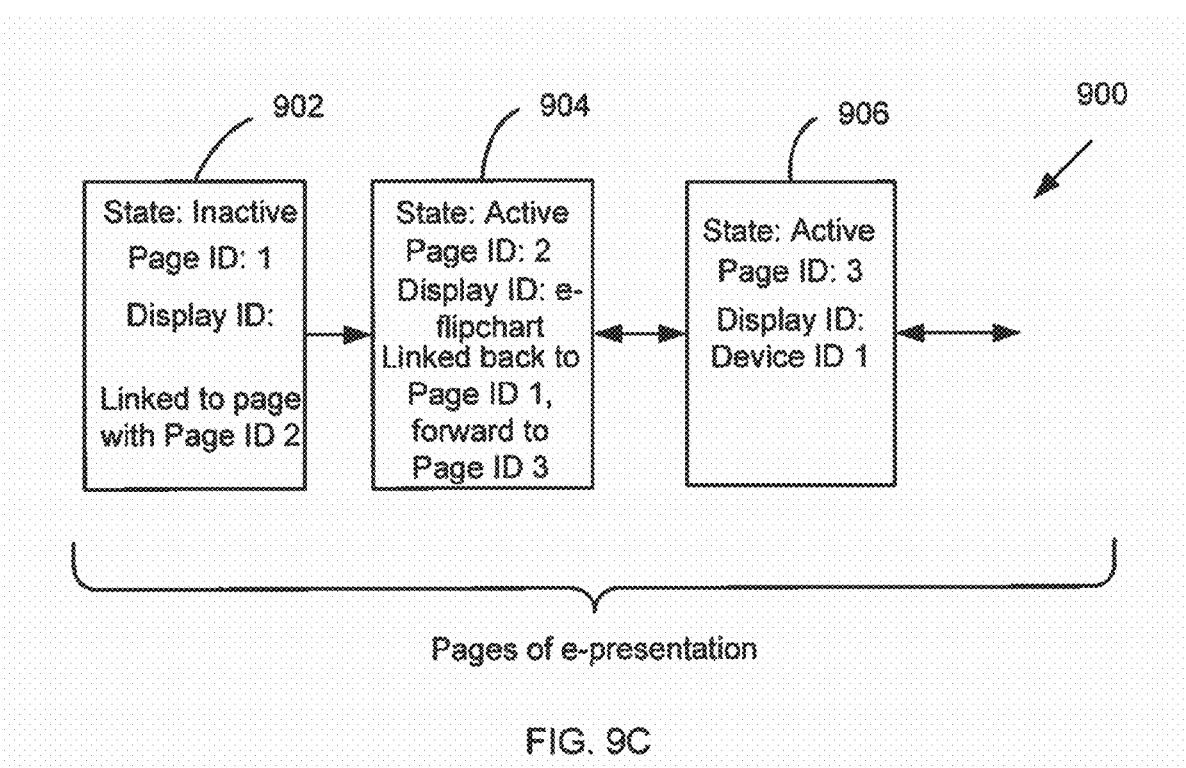

Continuation with the example, FIG. 9C depicts the metadata associated with an e-presentation that is shared with other owners/devices in order to collaborate on the e-presentation. In FIG. 9C, a third page (906) is added to the e-presentation. In this example, the third page is shared directly with another device (Device 1), while the second page (904) is still displayed on the active area of the e-flipchart apparatus. Device 1 (not shown) may be any smart phone, tablet, laptop, or desktop computer, a smart/interactive white board, or any other suitable device capable of displaying content and connecting to the e-flipchart apparatus or the shared e-presentation server (1002). Further, Device 1 may be connected to the e-flipchart apparatus via a point-to-point or a network connection that may be wired or wireless, such as via the Internet, or indirectly connected via a cloud server. Continuing with the data structure (900) content, the first page (902) remains inactive, and the second page (904) is updated to reflect that it is linked to page 1 (902) before and page 3 (906) after. In one or more embodiments of the invention, the state of the third page is also active, because even though it is not displayed on the e-flipchart apparatus, it is being displayed on another device (i.e., Device 1). Accordingly, the Display ID of the third page (906) is Device ID 1, which identifies Device 1.

Those skilled in the art will appreciate that page 3 (906) of the e-presentation as described in FIG. 9C above may be shared locally (i.e., in the same room with others viewing the e-presentation) or remotely (i.e., via a network connection to someone viewing the e-presentation on a remote device). Further, information may be sent and received by Device 1 and the e-flipchart apparatus bi-directionally, either through a server configured to store and manage the entire e-presentation file, or directly. Accordingly, a portion of or the entirety of e-presentations created on the e-flipchart apparatus may be shared and edited by a plurality of devices, all connected to the e-flipchart apparatus or to a shared e-presentation server. This allows for collaboration with audience members who are not physically located in the room where the e-flipchart is located.

FIG. 10 shows a system for sharing an e-presentation created on an e-flipchart apparatus in accordance with one or more embodiments of the invention. Specifically, FIG. 10 shows an e-presentation server (1002) connected via a network (1004) to the e-flipchart apparatus (1006) on which an e-presentation (1008) is created. In one or more embodiments of the invention, the e-presentation server (1002) may be a remote server configured to store and manage the e-presentation as a shared file. For example, the e-presentation server may be a cloud computing server or any other suitable type of server. In such cases, as shown in FIG. 10, the e-presentation server includes a copy of the e-presentation (1008). In one or more embodiments of the invention, the e-presentation server (1002) is configured to assign an e-presentation ID to an e-presentation when it is created or displayed on the e-flipchart apparatus display (1006). All the pages of an e-presentation are then associated with this e-presentation ID. In addition, the e-presentation server (1002) is configured to enforce the permissions of the e-presentation and may maintain and/or back-up the data structure (see e.g., FIG. 5) that is created for each e-presentation. The e-presentation server (1002) may also be configured to synchronize a shared e-presentation based on multiple contemporaneous inputs from other devices (e.g. 1007) connected to the same e-presentation.

In one embodiment of the invention, if multiple devices are concurrently editing an e-presentation, then when a specific device makes a change to the e-presentation, the device sends an incremental update to the e-presentation server (1002). In response to receiving the update, the e-presentation server updates its copy of the e-presentation and then sends the incremental update to all other devices (except the device that sent incremental update).

Continuing with the discussion of FIG. 10, the network (1004) may be any wired or wireless network configured to facilitate bi-directional communication between the e-presentation server (1002) and the e-flipchart apparatus and directly between device 1 (1007) and device 2 (1010). As described above, the network (1004) may be the Internet or any other suitable network. Device 1 (1007) and Device 2 (1010) may be local devices in the same room as the e-flipchart apparatus, or remote devices all connected to the e-flipchart apparatus via the e-presentation server (1002). Device 1 (1007) and Device 2 (1010) may be tablets, smart phones, laptops, desktop PCs, a wearable device, such as a an interactive watch or bracelet, or any other suitable device. Alternatively, one or more of Device 1 (1007) and Device 2 (1010) may be additional e-flipcharts. The system of FIG. 10 allows users to see and collaborate on e-presentations that may be updated by a remotely connected device in real-time. The following example illustrates this concept using the components of FIG. 10.

Suppose that Device 1 (1007) is in the same physical location as the e-flipchart (1006) and Device 2 (1010) is a remote device. A presenter/user of the e-flipchart apparatus (1006) may, while editing or showing the e-presentation, invite audience members to collaborate and provide input in the form of writing or drawing into the e-presentation that has been created and is being presented on the e-flipchart apparatus. In this case, the presenter/user may provide an input that results in Device 2 (1010) being granted permission to edit the e-presentation. In such scenarios, Device 2 (1010) may connect to the e-presentation server via the network (1004), download the e-presentation, and then edit the e-presentation concurrently with Device 1 (1008) and e-flipchart apparatus (1006). When Device 2 (1010) is finished editing, the e-presentation server may delete the Device 2 Display ID. Multiple pages of the e-presentation may be shared individually, or the entirety of the e-presentation may be shared using the system of FIG. 10. Further, multiple pages of an e-flipchart apparatus may be edited in parallel, and the e-presentation server may be configured to synchronize the e-presentation when editing is completed.

In an alternative embodiment, Device 2 (1010) may display a GUI (1012) on its screen with various buttons for different functions, one of them being a button with a page flip function. Using the GUI, Device 2 (1010) may manipulate what is being displayed on the active area on the e-flipchart apparatus, without having actual editing capability. In order for Device 2 (1010) to manipulate the content displayed on the e-flipchart, Device 2 (1010) must be connected to the e-flipchart apparatus (1006) or to the e-presentation server (1002). The connection may be wireless or wired. In this scenario, the owner of the e-presentation may provide Device 2 (1010) with the GUI by providing an input that allows Device 2 viewing permissions, but not editing permissions.

Those skilled in the art will appreciate that the e-flipchart apparatus may be used in any suitable environment, for example, where traditional paper flipcharts would conventionally be useful. For example, the e-flipchart apparatus may be used in conference rooms, classrooms, boardrooms, or any other suitable environment. In one or more embodiments of the invention, the e-flipchart apparatus is designed to connect to the outside world using digital technology such as network connections, and to keep a written record of what was written on the apparatus. In addition, with the e-flipchart apparatus of the present invention, the ability to create and store a presentation before it is presented before an audience on the e-flipchart apparatus is available. For example, the e-flipchart apparatus may have removable memory on which a presentation may already be created and stored, and when the removable memory is installed into the e-flipchart apparatus, the pre-created e-presentation may be shown on the reflective display. E-presentations created using the e-flipchart apparatus may be stored, copied, shared, revised, transferred, and managed using the information described above. Moreover, because the e-flipchart apparatus uses a reflective display, it mimics the look and feel of traditional paper flipcharts.

As discussed above, the invention relates to linking or otherwise combining multiple interactive devices to create a multi-device workspace. FIGS. 10-20B describe various embodiments for creating and using a multi-device workspace in accordance with one or more embodiments of the invention.

Figure 11A:
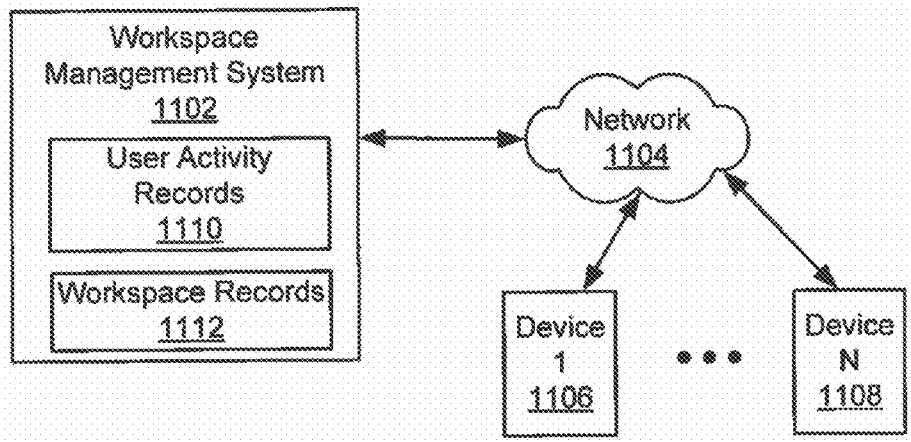
FIG. 11A shows a system in accordance with one or more embodiments of the invention.

FIG. 11A shows a system in accordance with one or more embodiments of the invention. The system includes a workspace management system (1102) and one or more devices (Device 1 (1106), Device N (1108)) connected over a network (1104).

In one or more embodiments of the invention, the workspace management system (1102) may be any computing system (see e.g., FIG. 21) that is configured to track and manage the metadata associated with the multi-device workspace (not shown). In one or more embodiments of the invention, the workspace management system (1102) may operate in a cloud computing environment. Specifically, the workspace management system (1102) may include cloud storage for storing a user activity record (1110) (in accordance with FIG. 11B) and track one or more workspace devices (1112), each of which have a display area that makes up a portion of the multi-device workspace. In one or more embodiments of the invention, the workspace management system (1102) may store workspace records (1112) (i.e., interactive devices that are associated with each workspace) by storing an identifier for such interactive device. The user activity record (1110) and the workspace records (1112) may be data structures for storing data related to a user.

As described above, each device (Device 1 (1106), Device N (1108)) that is a part of the multi-device workspace includes a display area that forms a portion of the multi-device workspace on which content may be displayed. In one or more embodiments of the invention, devices (Device 1 (1106), Device N (1108)) forming the multi-device workspace are interactive devices on which a user may provide input (e.g., touch input, input via digital marker or stylus, etc.) and view content objects. Each device (Device 1 (1106), Device N (1108)) may include its own CPU, memory, display, connection to a network, and other hardware/software capabilities. Such devices (Device 1 (1106), Device N (1108)) may include, for example, smart phones, tablets, desktop computers, gaming devices, e-flipchart apparatuses (see e.g., FIGS. 1-10), interactive whiteboards, or any combination of devices from the aforementioned types of interactive devices.

Those skilled in the art would appreciate that other suitable interactive devices could include any such interactive device with functionality to connect to the network (1104) may be used without departing from the invention. Thus, for example, if the workspace devices (Device 1 (1106), Device N (1108)) include four e-flipchart apparatuses in a room, then the multi-device workspace would be formed of the total display area of each e-flipchart apparatus. That is, the combined display area of each of the four e-flipchart apparatuses would be known as the multi-device workspace and may be used to present or view content objects. Similarly, if the workspace devices (Device 1 (1106), Device N (1108)) include a smart phone and three interactive tablets, then the combined display areas of all four devices in total would be the multi-device workspace on which content objects may be viewed/presented.

Those skilled in the art will appreciate that a multi-device workspace may be formed with only a single interactive device. Further, those skilled in the art will appreciate that although each workspace device has a separate display area, the display area of each workspace device becomes part of a larger multi-device workspace that is linked to the display areas of the other workspace devices when a single user logs into all the workspace devices. Accordingly, from the perspective of the user the multi-device workspace while made up separate physical devices may be viewed as a single display area. Said another way, the user may interact with the multi-device workspace in a similar manner that the user interacts with a single display device.

In one or more embodiments of the invention, the devices (Device 1 (1106), Device N (1108)) may be private devices owned by a user (e.g., a smart phone that belongs to a user), public devices provided in, for example, offices, schools, or any other public place where multiple users may have access to the devices, or a combination of private and public devices. In order for devices to become part of the multi-device workspace, in one or more embodiments of the invention, the same user may be logged into all of the devices.

The network (1104) over which the devices (Device 1 (1106), Device N (1108)) connect to the workspace management system (1102) may be a local area network (LAN), a wide area network (WAN) such as the Internet, a mobile network, or any other suitable type of network.

Figure 11B:
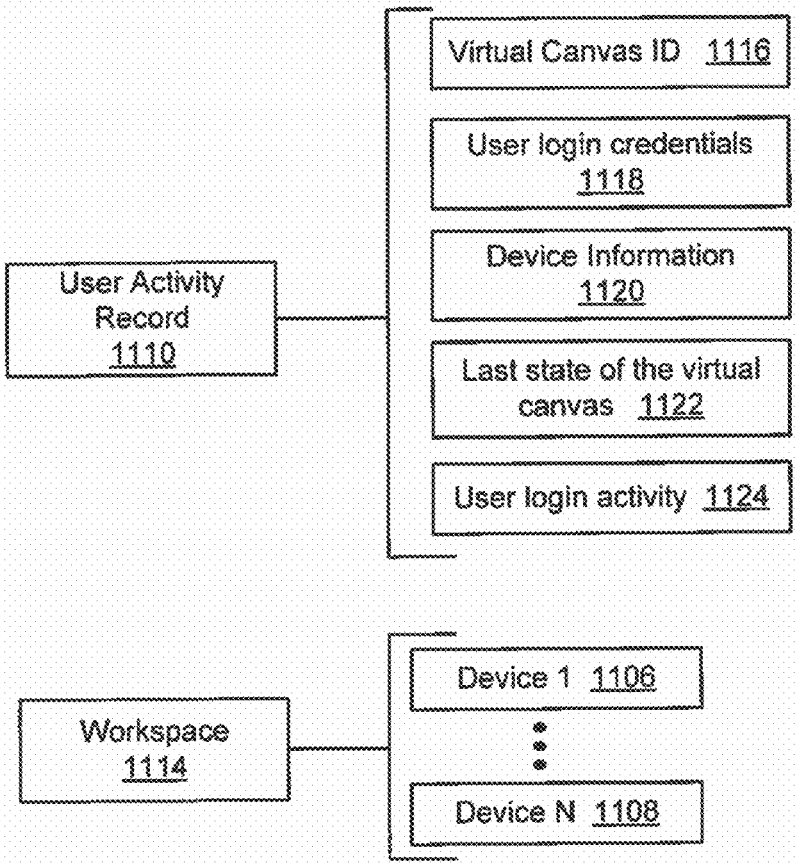
FIG. 11B shows data relationships in accordance with one or more embodiments of the invention.

FIG. 11B shows the data that may be stored and/or tracked by the workspace management system of FIG. 11A in accordance with one or more embodiments of the invention. More specifically, as shown in FIG. 11B, the workspace management system may store one or more user activity records (1110) (described below). In addition, the workspace management system may also track which devices (1106, 1108) are associated with a given workspace (1114). The workspace records (1112) may include an identifier of each device (Device 1 (1106), Device N (1108)), or any other suitable information that may be used to track the devices that form (or are a part of) the multi-device workspace.

Turning to the user activity records, the user activity record (1110), in one or more embodiments of the invention, may be any data structure such as a table, array, linked list, etc., that is configured to store the information that identifies the common user that is logged into the workspace devices that make up the multi-device device workspace. Specifically, in one or more embodiments of the invention, the user activity record may store an virtual canvas ID (1116), user login credentials (1118), device information (1120), a last state of the virtual canvas (1122), and a log of user login activity (1124). Each of these pieces of data are described below.

In one or more embodiments of the invention, the virtual canvas ID (1116) uniquely identifies an virtual canvas. In one embodiment of the invention, an absolute represents content objects that may be selected and/or displayed in the multi-device workspace. Content objects may include text and/or image data. In one or more embodiments of the invention, the virtual canvas may be a file, and content objects associated with that file may be the text and/or image data that is included in the file. The file in its entirety, including all of the data in the file, is what is known as the virtual canvas. For example, an e-presentation shown on an e-flipchart apparatus described in FIGS. 1-10 above is a file that may be referred to herein as the virtual canvas (1116). Content objects within the virtual canvas may include portions of a file. For example, content objects may be a portion of text data from the file, or one or more images contained in the file. Using the e-presentation example, content objects may be the pages of the e-flipchart presentation.

In one or more embodiments of the invention, content objects may be grouped together to form content object groups. Content object groups are simply multiple portions of content in the form of text or images within the virtual canvas (1116) grouped together for display on the multi-device workspace. For example, if the virtual canvas (1116) is an e-presentation having pages, then an example of a content object group within the virtual canvas may be the text and/or image data that forms one or more pages of the e-presentation. When the virtual canvas is any file, content object groups may be paragraphs, sentences, one or more drawings, or other groupings of text/image data that may be selected and displayed on a portion of the multi-device workspace. Those skilled in the art would appreciate that the granularity of content object groups may depend on the type of content objects of the virtual canvas. For example, if the content objects are logically grouped into pages, then content object groups may be one or more pages. However, if the content objects are brainstorming notes, for example, then content object groups may be specific phrases or words within the notes. Further, those skilled in the art will appreciate that while a given virtual canvas may include an initial set of content object groups (e.g., pages), the content objects within a given virtual canvas may be regrouped any point. For example, a user may create multiple content object groups from content objects on a single page within the virtual canvas. Alternatively, the user may create a content object group that spans multiple pages. The above examples are not intended to limit the scope of the invention.

Continuing with the discussion of FIG. 11B, in one embodiment of the invention user login credentials (1118) stored in the user activity record (1110) may include one or more types of user authentication information that may be used to identify the user. For example, user login credentials (1118) may be a username/password pair, biometric data, a radio frequency identifier, a Bluetooth identifier, a near-field communication (NFC) tag ID, or any other unique identifier or any combination of the aforementioned types of user login credentials. As described above, the same user is logged into each workspace device in order for the workspace device to be a part of the multi-device workspace. However, user login may be performed in different ways on each workspace device. For example, a user may login using a username/password pair on a first workspace device, and use an optical label to log into a second workspace device. Alternatively, as described below in FIGS. 12-17, the same login method may be used to log into all of the multi-workspace devices. Because the workspace management system tracks the user activity in the user activity record (1110), each different type of login is recognized as being the same user. Further, the user login activity (1124) stored as part of the user activity record (1110) is a log that tracks which devices the user is logged into, the timestamp for when the login occurred, and the login method used for each workspace device login. In one embodiment of the invention, the user activity record may only track whether the user is successfully logged into a given device without recording the specific credentials that the user used to log into the device.

Continuing with the discussion of FIG. 11B, in one embodiment of the invention device information (1120) may include information on the location of each workspace device. Location information may be obtained and stored in the user activity record using GPS information for workspace devices equipped with such functionality. Location information may be geographical location information. The geographic location of a workspace device stored as device information (1120) may be a city, a building, a room, or any other geographic information at any granularity. The location information of workspace devices may be obtained from a secondary user device that is used to log into the workspace devices. For example, in one or more embodiments of the invention, a user may use a personal smartphone encoded with an NFC tag or equipped with Bluetooth Low Energy (BLE) to log into the workspace devices. In this case, the location information for the workspace devices may be obtained by the user's smartphone, which is used as a secondary device used to identify the user and log into the workspace devices. In another embodiment of the invention, the user may be prompted to provide the location of a given device and then the workspace management system may store this information in the workspace management system.

The device information may also include, but it not limited to, the size of the display on the device, the dimensions of the display, the orientation of the device (e.g., landscape, portrait, etc.), and the display resolution of the device.

In one embodiment of the invention, the user record includes a device ID (which uniquely identifies the device). In such cases, the device ID is also associated with a device record (not shown) that may be located using the device ID. The device record may include the device information (1120) described above.

In one or more embodiments of the invention, the last state of the virtual canvas (1122) represents the last display state of the content objects displayed in the multi-device workspace. In other words, the last state of the virtual canvas (1122) represents the display state of data (content objects) as seen by the multi-device workspace across the plurality of workspace devices, immediately before a user logs outs of one or more of the devices that make up the multi-device workspace. Thus, by identifying the user when the user logs out a device, the workspace management system is able to capture the last state of the multi-device workspace on which the user was working. In one embodiment of the invention, the user may be automatically logged out of one or more devices in the multi-device workspace after a predetermined time of inactivity in the multi-device workspace has elapsed.

Figure 12:
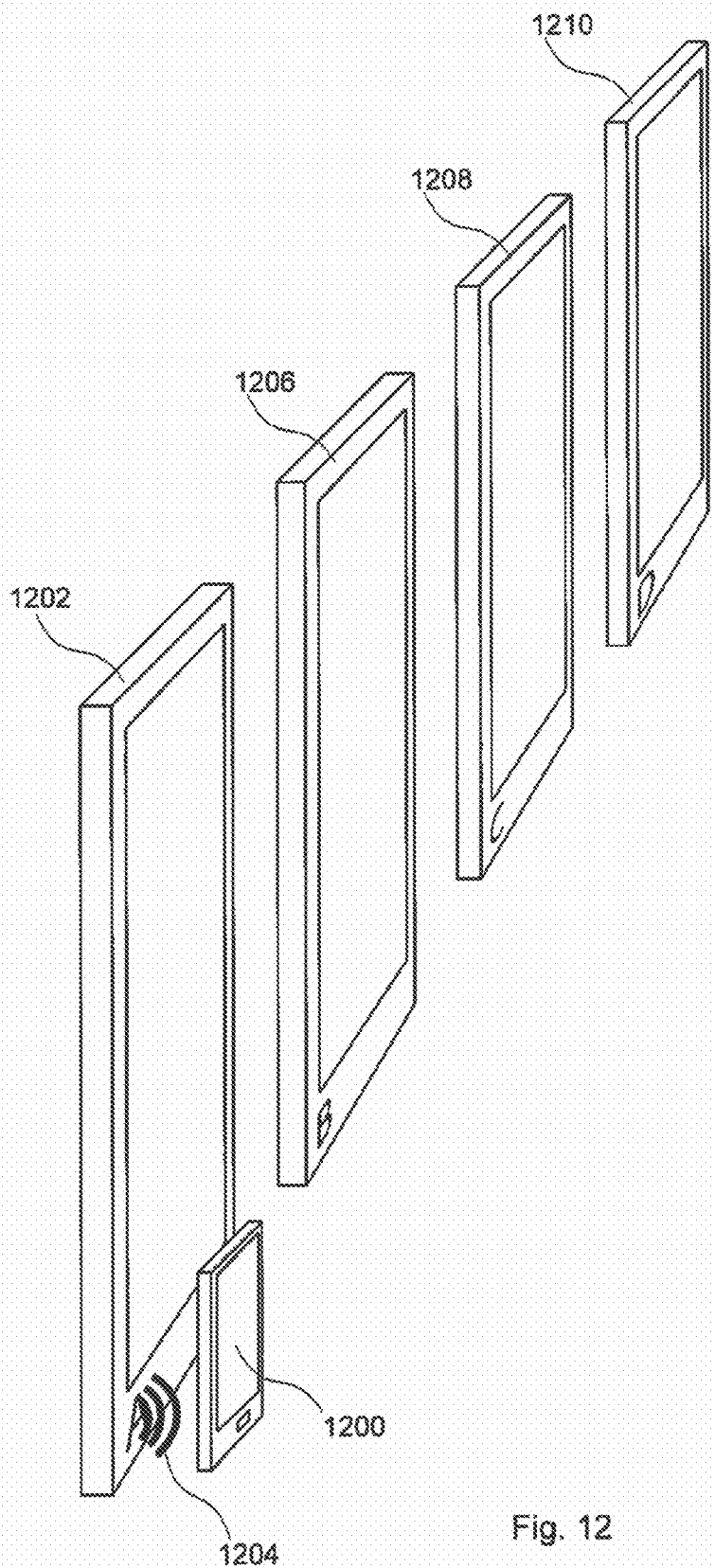
FIGS. 12-17 show examples of porting multi-device workspace data in accordance with one or more embodiments of the invention.
Figure 13:
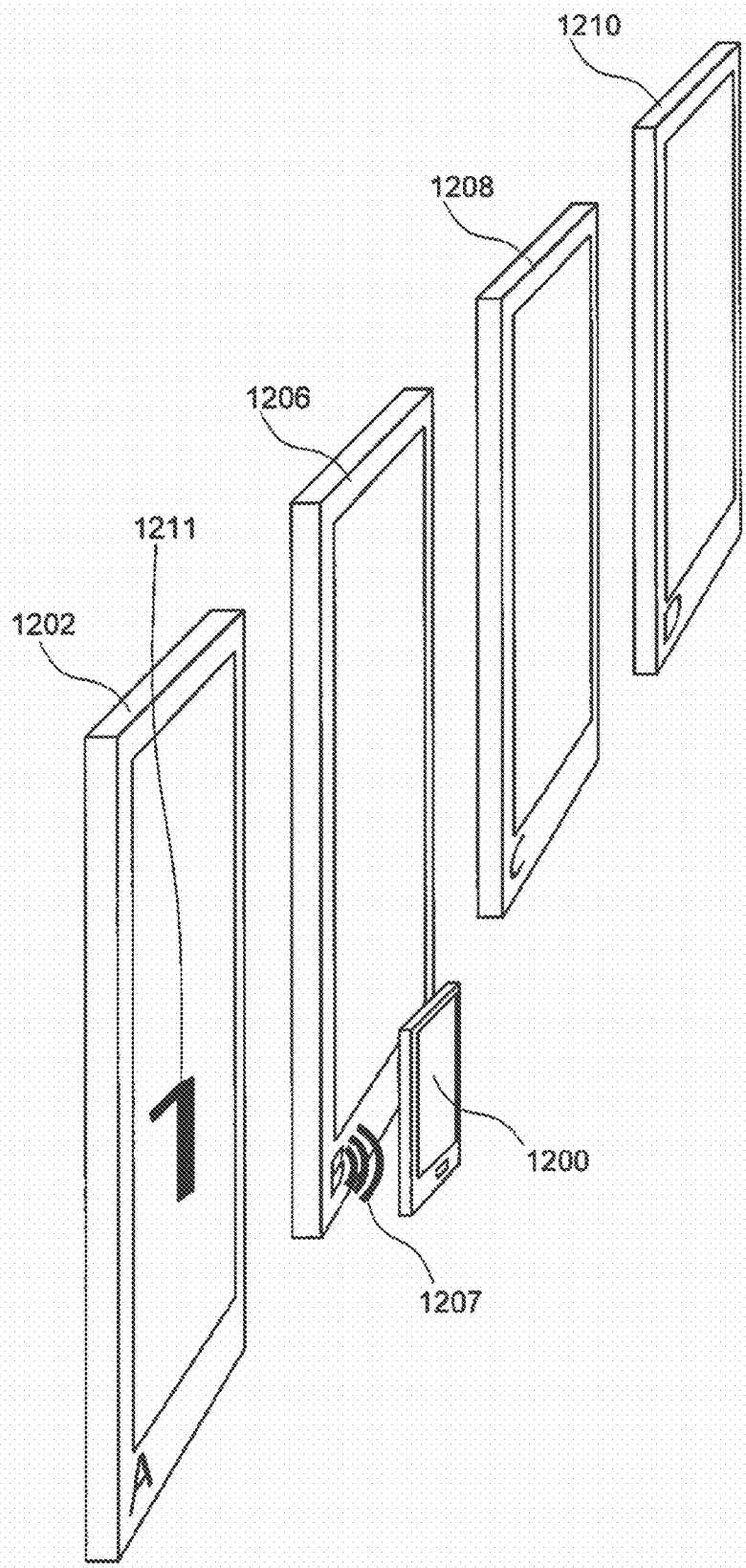

FIGS. 12-17 shows an example of a user logging into multiple workspace devices to create (or form) a multi-device workspace. The example is not intended to limit the invention. Turning to FIG. 12, in FIG. 12, a secondary device (1200), i.e., a user's smartphone, is used to log into a first device (1202). In the embodiment shown in FIG. 12, the user logs into the first of four devices (1202) using the secondary device (1200), which has NFC capability. Specifically, the user's smartphone (1200) encodes an NFC tag, and the first workspace device (1202) has an NFC transmitter/receiver that emits a signal (1204) that detects the presence of the NFC tag, decodes it, and loads the user's credentials to the device (1202). In one or more embodiments of the invention, the user's credentials are temporarily loaded onto the first device (1202), either for a predetermined period of time, or until the user logs out (or is logged out) of the device or the multi-device workspace. In one or more embodiments of the invention, once the first device (1202) is identified by the workspace management system, the workspace management system recognizes that this is the first device in a multi-device workspace. Accordingly, the first device (1202) may be assigned a work space device ID 1 (1211), as shown in FIG. 13. The assigning of content and clustering of workspace devices is discussed below in FIG. 18.

In one embodiment of the invention, the workspace device ID uniquely identifies the device within a given workspace. Further, once a workspace device is assigned to a given device, the workspace device ID may be displayed temporarily on the workspace device (see e.g., FIG. 17) in order to provide a visual indication to the user about which workspace device ID is assigned to each workspace device.

FIG. 13 is a continuation of FIG. 12, in which the user logs into a second device (1206) using the same NFC capability described above. The second device (1206) emits a signal (1207) that detects the presence of the NFC tag on the user's secondary device (1200), decodes it, and loads the user's credentials onto the second device (1206). As explained above, the second device (1206) is recognized by the workspace management system as being part of the multi-device workspace and is assigned work space device ID 2 (1213).

Figure 14:
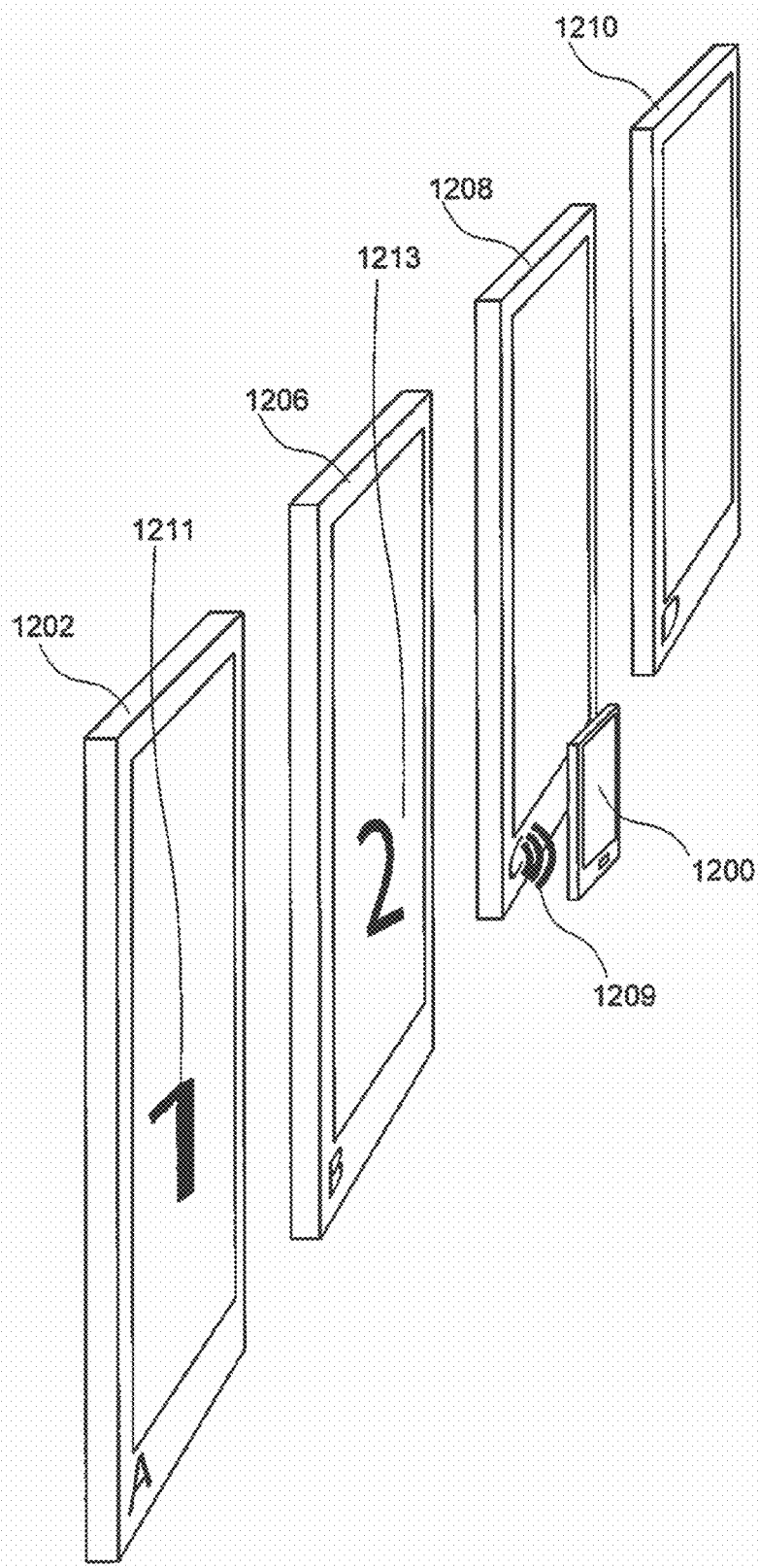

The process of logging into the third device (1208) continues in FIG. 14. NFC capability (1209) is used to log into the third device (1208) using the user's secondary device (1200). As explained above, the third device (1208) is recognized by the workspace management system as being part of the multi-device workspace and is assigned work space device ID 3 (1215).

Figure 15:
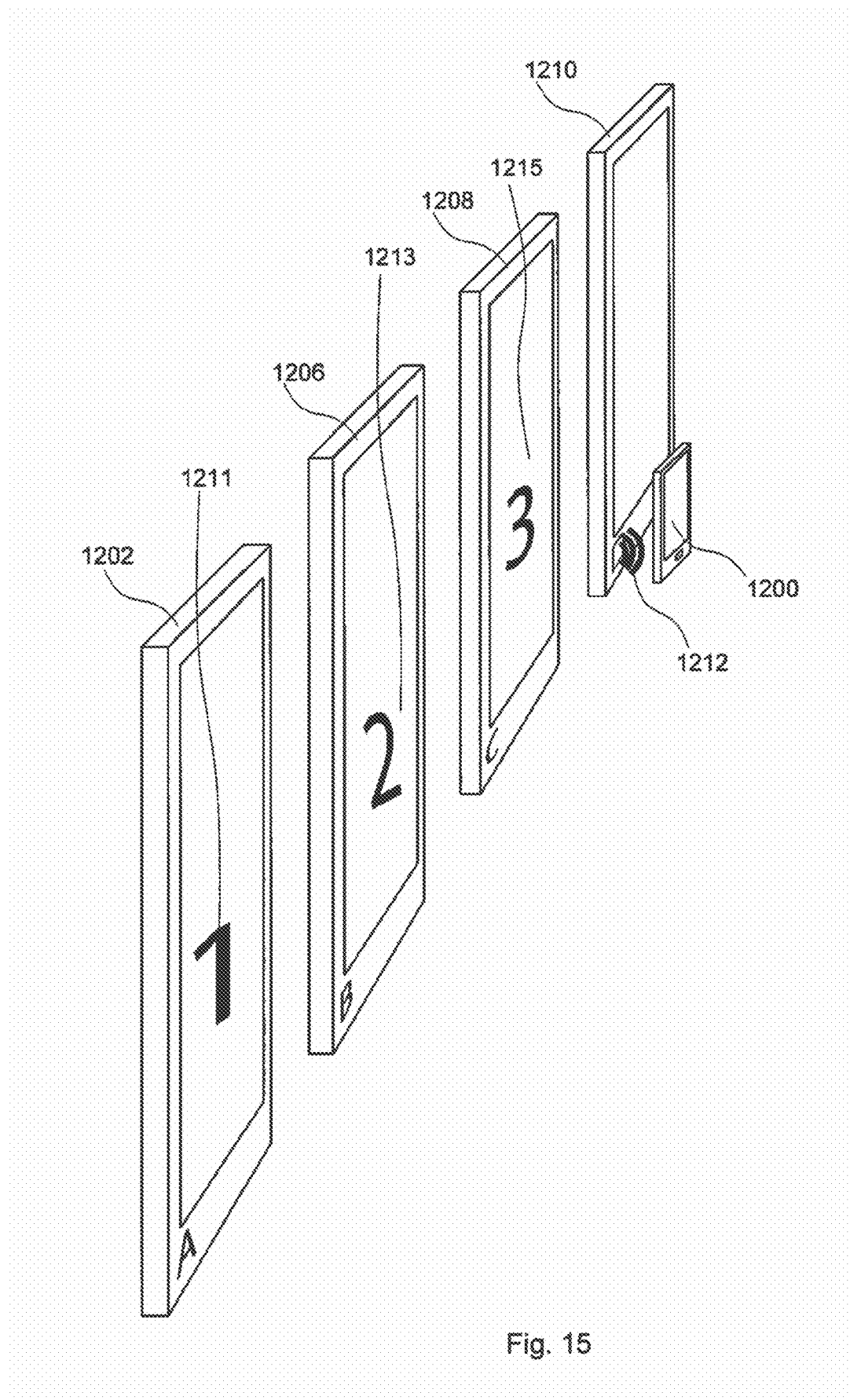

In FIG. 15, the user logs into the fourth device (1210) and, after a successful log in, the fourth device is associated with the multi-device workspace that includes the three other devices (1202, 1206, 1208). Finally, as shown in FIG. 16, the fourth device (1210) is assigned workspace device ID 4 (1217).

Figure 16:
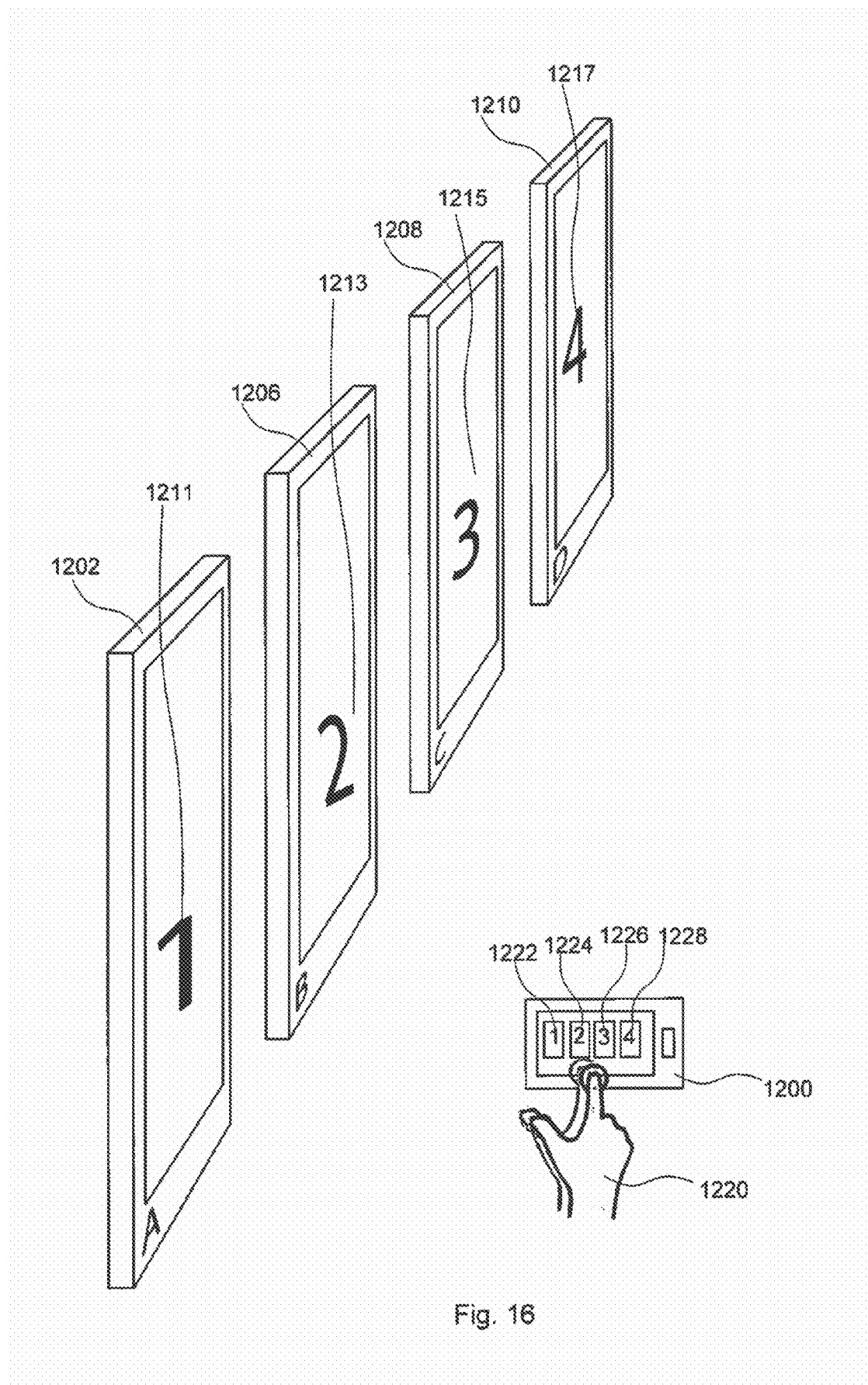

FIG. 16 shows all four workspace devices (1202, 1206, 1208, 1210) are logged into with the user's credentials, where each device has been assigned a workspace device ID. The assignment of workspace device IDs is tracked by the workspace management system, e.g., in the workspace records (1112). As discussed more fully below in FIG. 18-19, in one or more embodiments of the invention, workspace device IDs may be assigned based on the last previously known setup the user was working on, even if that was in a different location and even if it was with more or fewer devices than the current multi-device workspace setup. In addition, workspace device IDs may be assigned based on the location of the workspace devices and the timestamp of the login of one workspace device relative to another workspace device. As shown in FIG. 16, the user's secondary device (1200) that was previously used to login or transmit the user's credentials to the workspace devices (1202, 1206, 1208, 1210) may have on its display the information regarding the devices (1222, 1224, 1226, 1228) to which the credentials or login information has being transmitted.

In one or more embodiments of the invention, the user's secondary device (1200) may also be used as a secondary controlling device with a GUI as described above in FIG. 10. The user may use touch input (1220), for example, to control the display of one or more of the workspace devices into which the user is logged in. For example, in one or more embodiments of the invention, a content object(s), a content object group(s) or content icon may be displayed on the user's secondary device (1200). Using his or her finger(s) (1220), the user may select which content object group(s) from the virtual canvas is/are to be displayed on each of the workspace devices by using the GUI on the secondary device (1200).

Alternatively, in one or more embodiments of the invention, the secondary device (1200) may also be a workspace device with a display area that is part of the multi-device workspace, along with the display screens/areas of devices 1202, 1206, 1208, and 1210.

Figure 17:
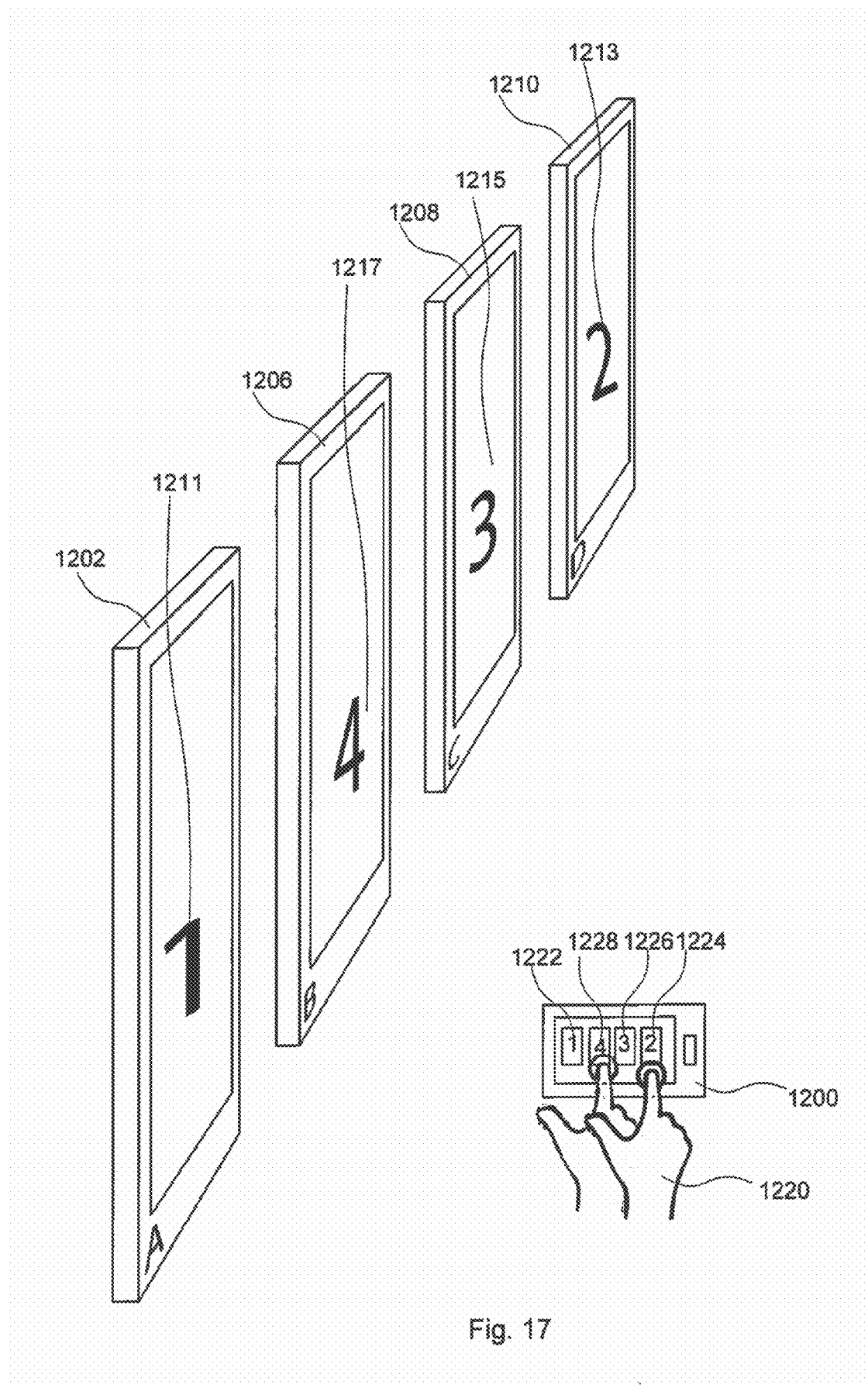

FIG. 17 shows a similar multi-device workspace described above in FIG. 16, where the user logged into the 4 boards in a different order from the left-to-right order of FIG. 16. FIG. 17 shows that the user using the secondary device (1200) is able to align the order of the workspace device IDs to correspond with the physical left-right order of the devices. Specifically, in FIG. 17, the workspace management system has updated its records to reflect that the fourth registered device (1206) is located to the right of first registered device (1202) and the third registered device (1208) is located to the right of the fourth registered device (1206), and the second registered device (1210) is to the right of the third registered device (1208). Using this information, the workspace management system will allow the user to send content objects to the expected device with UI operations such as "send this content to the device on the left".

Those skilled in the art will appreciate that other login methods may be used to log into each workspace device. For example, in one or more embodiments of the invention, the user may use another secondary device such as USB key, a username/password pair, an optical label, an NFC token, a Radio Frequency ID, a Bluetooth ID, or a combination of one or more of these methods to log into the workspace devices. For example, an optical label having the user's login credentials may be generated and displayed on the user's secondary device and scanned by the cameras of each of the workspace devices to read, obtain, and apply the user's credentials for log in to the devices. In another example, an optical label may be displayed on the workspace (or on a portion thereof). The optical label may be subsequently read by a user's secondary device. The secondary device may decode the optical label in order to extract connection information that will allow the secondary device to provide user credentials to one or more workspace devices. Further, those skilled in the art will appreciate that the data structures discussed in FIG. 11B above would be populated as the user logs into each workspace device shown in FIGS. 12-17. That is, for each log in, the timestamp of the log in, the device locations, the workspace device IDs, etc. would all be stored in the user activity record as described above so that the workspace management system is able to track and manage the workspace devices and user interaction with the workspace devices.

Figure 18:
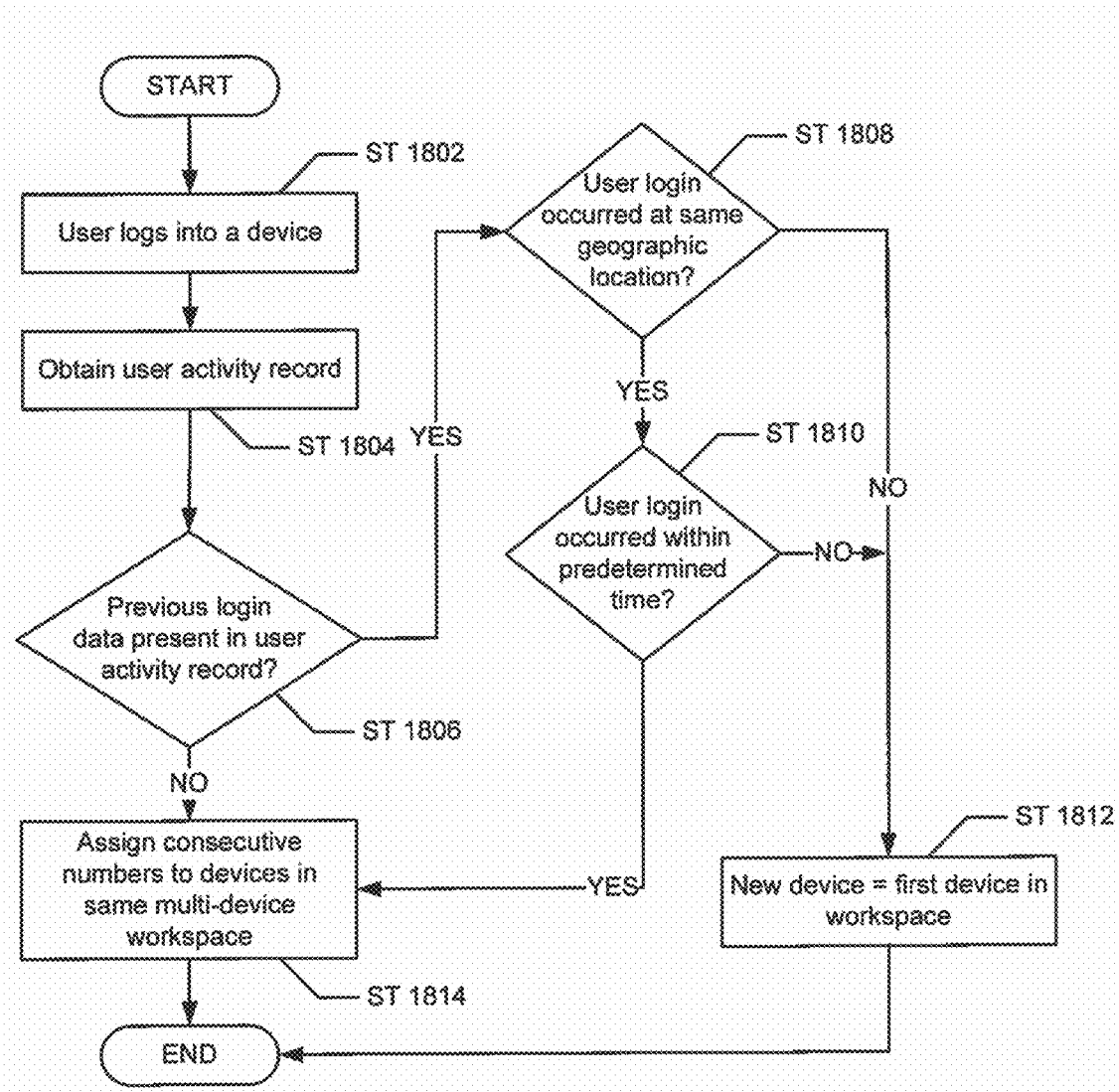
FIGS. 18-19 show flowcharts for porting multi-device workspace data in accordance with one or more embodiments of the invention.

FIG. 18 shows a flow chart in accordance with one or more embodiments of the invention. Specifically, FIG. 18 shows a process for creating a multi-device workspace. In step 1802, a user logs into a device. This device is referred to as a workspace device, even if it is the only device onto which the user logs in. Based on the user's log in, the workspace management system is able to identify the user, and the user activity record for that user is obtained in step 1804. At this stage, the user activity record is examined to determine whether previous login data is present in the user login activity stored in the user activity record (step 1806). When previous login data does not exist in the user activity record, this indicates to the workspace management system that the user may be creating a new multi-device workspace. Accordingly, the process proceeds to step 1812 in which a new multi-device workspace is created and the device is denoted as the first device in the new-multi-device workspace.

Returning to step 1806, when previous login data is present in the user activity record (step 1806), the user activity record is checked to determine whether the latest login to the device in step 1802 occurred at a same location as the most recent previous device log in (step 1808). In one or more embodiments of the invention, a same location may be any suitable level of granularity. For example, the login in step 1802 may be performed on a device in the same geographic location as the most recent previous user log in to another device. The same geographic location may be the same room, the same building, the same city, etc. Moreover, workspace devices may be in the same location without being physically adjacent to one another.

Returning to step 1808, if the device login is within a same location as the most recent previous log in, then a second determination is made as to whether the login of step 1802 occurred within the predetermined period of time (step 1810). Said another way, the timestamp of the most recent previous log in to a workspace device is compared to the timestamp of the login that occurs in step 1802. If the logins occurred within a span of a predetermined period of time, then a next consecutive number is assigned to the device onto which the user logged in in step 1802. In other words, the workspace management system uses location and time of log in as two criteria by which to determine whether the user wishes to create a multi-device workspace. The process then proceeds to step 1814 in which the device is associated with an existing workspace and assigned the next consecutive number (i.e., workspace device ID) for the workspace (see e.g., FIGS. 12-17). Those skilled in the art will appreciate that the invention is not limited to location and timing of the login to determine when a multi-device workspace is being created, and that other suitable criteria may be used for such a determination. For example, the user may include some default criteria in the user activity profile to indicate to the workspace management system when a multi-device workspace is being created. Further, in one embodiment of the invention, only time (e.g., step 1810) is used to determine whether a given device is part of a workspace. In such embodiments, the geographic location is not required and/or may not be known (or available).

Continuing with FIG. 18, when either the location of the workspace devices from the previous user login and the current user login or the time of login to the workspace devices does not meet the conditions set up by the workspace management system (step 1808 or 1810 result in a "No"), then the workspace management system assumes that the device onto which the user logged into in step 1802 is a device that is part of a new workspace, and assigns that device a first number in the new multi-device workspace (step 1812), and the process ends.

The above process describes how unique identifiers and sequence numbers are assigned to workspace devices forming a multi-device workspace. In one or more embodiments of the invention, workspace devices may be clustered together by the workspace management system. When a cluster of devices are connected together and the system has identified which device is the first, second and subsequent devices using the process of FIG. 18, a user only needs to interact with a single device in the cluster in order to populate any of the workspace devices within with content objects.

In one embodiment of the invention, performing steps 1802, 1804, 1806, and 1812 or performing steps 1802, 1804, 1806, 1808 and/or 1810, and 1812 results in the creation of a new multi-device workspace that includes a single device. Further, in one embodiment of the invention, steps 1802, 1804, 1806, 1808, 1810, and 1814 may be performed to add any number of other devices to the multi-device workspace. In this manner, a multi-device workspace may be dynamically created.

Figure 19:
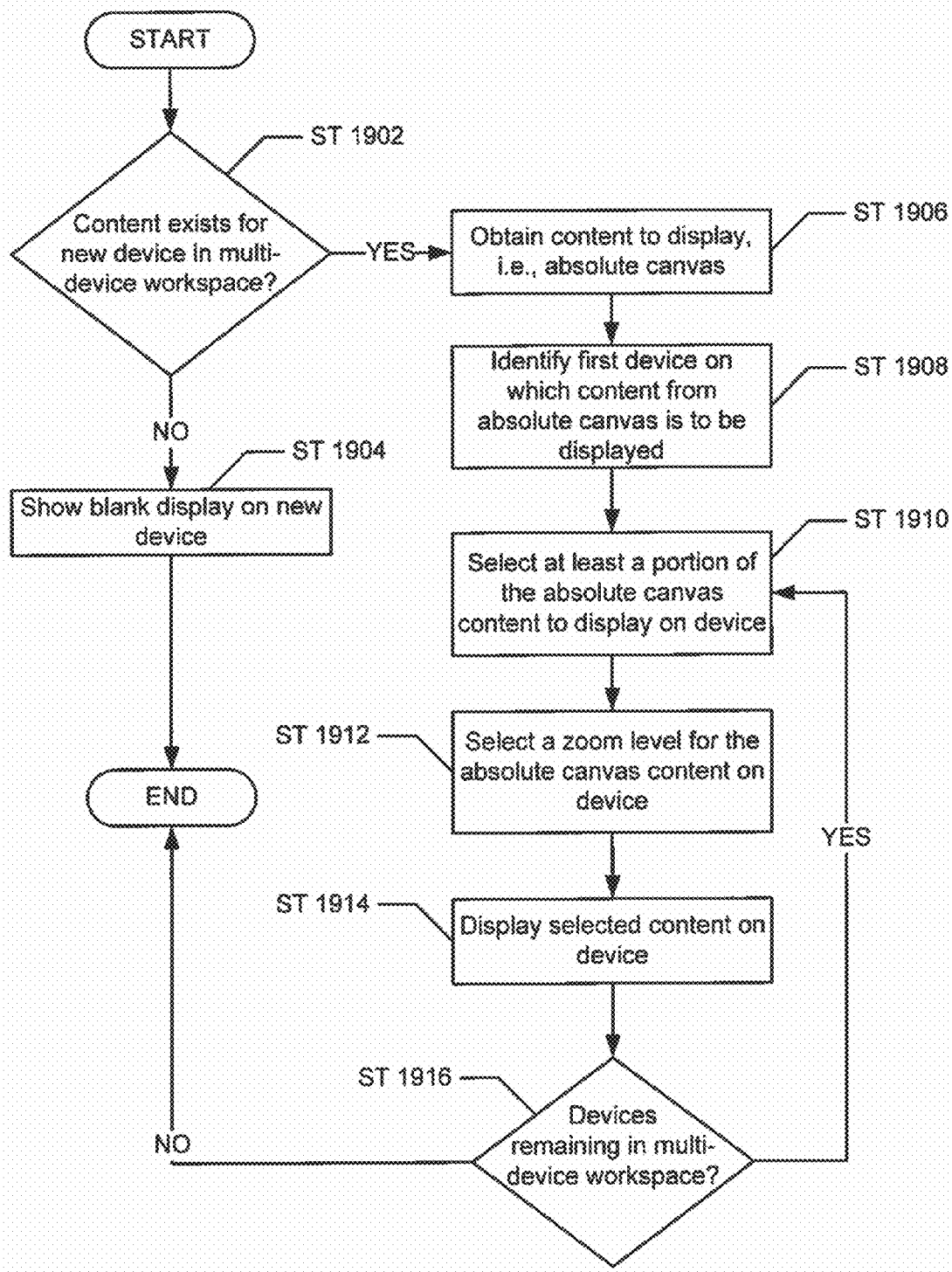

After a multi-device workspace (with one or more devices) has been created, the process in FIG. 19 may be performed.

FIG. 19 shows a flow chart for displaying content in a multi-device workspace in accordance with one or more embodiments of the invention. In step 1902, a determination is made as to whether content exists for the new device in the multi-device workspace. Specifically, in one or more embodiments of the invention, after the multi-device workspace has been created, the workspace management system determines whether the user generated content objects in a previous multi-device workspace session (e.g., the last time the user logged in and added, deleted and/or modified a content object(s) in a virtual canvas). More specifically, the workspace management system may analyze the user active record(s) for the user (i.e., the user that created the multi-device workspace) to determine whether there exists a last state of the virtual canvas (see FIG. 11B, 1122). If there is no last state of the virtual canvas, then the process proceeds to step 1904. Alternatively, if there is a last state of the virtual canvas, then the process proceeds to step 1906. In one embodiment of the invention, even if there is a last state of the virtual canvas, the user may opt to proceed to step 1904 to create a new virtual canvas instead of proceeding to step 1906.

In another embodiment of the invention, the determination on step 1902 is based on whether there are one or more content objects to automatically display in the multi-device workspace. If there are content objects to display, the process proceeds to step 1906.

In step 1904, all the display areas of the workspace devices may be blank until the user generates content objects during the current multi-device workspace session.

In step 1906, the content objects to display in the multi-device workspace are selected. In one embodiment of the invention, selection the content objects to display results in the selection of an virtual canvas of which the selected content objects are a part. In another embodiment of the invention, step 1906 involves the selection of an virtual canvas instead of the selection of individual content objects (or groups of content objects).

Continuing with the discussion of step 1906, selecting of content objects to display may include, for example, obtaining the last display state of the virtual canvas. In another embodiment of the invention metadata associated with the virtual canvas may be used to select content objects to display. For example, the virtual canvas may be associated with information related to a certain place or time when a user login is made. Specifically, a user may have a document that is for a meeting scheduled for a particular day/time on the user's calendar, and, the user may store a default/pre-configured option that when he or she taps or logs in at a workspace device at the meeting location, by default, he or she wants particular content objects to be shown. Thus, rather than displaying the last display state of the virtual canvas upon log in, the user may set particular calendar events that trigger other content objects (from another file, for example) to be displayed on the multi-device workspace when the calendar conditions are met. In other words, the workspace device may display content objects addressed by the metadata. In one or more embodiments of the invention, this metadata may be stored in the user activity record.

Those skilled in the art will appreciate that content objects may be generated using other types of metadata without departing from the scope of the invention. For example, the metadata may be a calendar variable which indicates, at the user's preference's, that when the user taps or logs into a workspace device at a certain time or date, then a particular file will be shown across the multi-device workspace. For example, every Monday at 9:00 am is the user's weekly preparation meeting at the office. When the user taps or attempts to log into a workspace device in the meeting room or in his office on Monday at around 9:00 am, the workspace management system may store the calendar variable and recognize that the content objects generated for the virtual canvas from which the user may select particular content objects groups for display in the multi-device workspace should be "week's preparation meeting document."

In yet another embodiment of the invention, the workspace management system may be configured to "learn" the patterns of use of the user, over time. For example, if every day, the user starts the day by logging into his office workspace device and working on "File x", then, every Monday morning, the user continues drafting a presentation at the company's meeting room and Wednesday night, the user logs into a workspace device at the Rotary club meeting room to present some graphics. By analyzing the user's activity records, the workspace management system may be configured to detect that there is a continuation at Monday's meetings. In this case, when the user logs in to the workspace device on Monday, the first document shown (i.e., the content objects generated for the virtual canvas) may be the continuation of the work from the previous Monday.

Continuing with FIG. 19, once the content objects to display are selected in step 1906, the workspace management system identifies the first workspace device on which content objects from the virtual canvas are to be displayed (step 1908). The determination is step 1908 may be performed using the workspace device IDs (see e.g., FIGS. 12-17) assigned to the devices that are part of the multi-workspace generated using the process of FIG. 18. In other words, the sequential assignment of numbers to each workspace device in the multi-device workspace is obtained and the first device is identified.

In step 1910, at least a portion of the content objects in the virtual canvas (identified in step 1906) may be selected by the user (or automatically selected by the workspace management system) for display on the first device's display area. In one or more embodiments of the invention, selection of content objects from the virtual canvas for display on each workspace device may be performed in multiple ways. For example, the user's secondary device (see e.g., FIG. 17) with which the user logged into the workspace devices may be used as a user interface to control the display of content. The user may be able to see the entirety of the virtual canvas on the secondary device. In this case, the user may select various combinations of content objects (i.e., forming content objects groups) and indicate on which workspace device the selected content should be shown. Alternatively, in one or more embodiments of the invention, default options may be pre-configured and stored for display of content objects in a multi-device workspace. For example, when workspace devices are public devices with the same or similar display area on each device in the same geographic location (e.g., adjacent e-flipchart apparatuses), the content objects from the virtual canvas may be evenly distributed across all of the workspace devices such that the entire file represented by the virtual canvas is displayed across the workspace devices. Alternatively, when workspace devices in the same multi-device workspace are a mix of public and private devices, content objects from the virtual canvas may be mirrored onto each device, such that each device displays the same content objects.

In yet another embodiment, the workspace management system may prompt the user to select the content objects (or content object groups) that the user desires on each workspace device. For example, upon logging into a workspace device, the user may be prompted to choose whether the user wishes to display the last state of the virtual canvas, generate new content objects on a blank multi-device workspace, or use particular metadata stored in the workspace management system to obtain content objects for display.

Upon selection of at least a portion of the virtual canvas for display on the first workspace device (step 1910), the user may select a zoom level for the display of the selected content object groups on the first workspace device (step 1912). In one or more embodiments of the invention, the zoom level may be selected by the user based on the size of the display area of the first workspace device. For example, if the user was working on a file in his office and moves to share the file in a conference room on an e-flipchart apparatus with a relatively large display area, the user may zoom in on the content objects displayed on the e-flipchart apparatus. In one or more embodiments of the invention, the zoom level for different types of workspace devices may be pre-configured and stored in the user activity record. Alternatively, the default zoom level for every workspace device may be the same.

Those skilled in the art will appreciate that other display characteristics besides the zoom level may also be selected by the user. For example, the orientation of the display (e.g., landscape or portrait) is another display characteristic that the user may be prompted to select before the selected portion of the virtual canvas is displayed on the first workspace device.

In one embodiment of the invention step 1912 is performed automatically by the workspace management system.

In step 1914, the selected content object(s) and/or content object group(s) from the portion of the virtual canvas are displayed on the first workspace device, at the selected zoom level. In one embodiment of the invention, step 1914 involves transmission of the selected content object(s) and/or content object group(s) to the appropriate workspace device. At this stage a determination is made as to whether there are additional devices in the multi-device workspace (step 1916). If there are additional devices, then the process returns to step 1910 for the user to select the content object groups for the next device in the multi-device workspace. When no additional devices remain in the multi-device workspace (step 1916), then process ends.

Those skilled in the art will appreciate that while FIG. 19 discusses the process of selecting and displaying content sequentially for each device starting with the first device in the multi-device workspace, in alternate embodiments of the invention, devices in a multi-device workspace may be populated with content objects simultaneously. For example, when the devices are to display the same content objects (the devices mirror each other), all devices in the multi-device workspace may be populated with selected content objects at the same time. In this scenario, the devices may show the same content objects at different zoom levels and in different orientations (depending on the size of the display area of each workspace device), or with the same display characteristics.

Figure 20A:
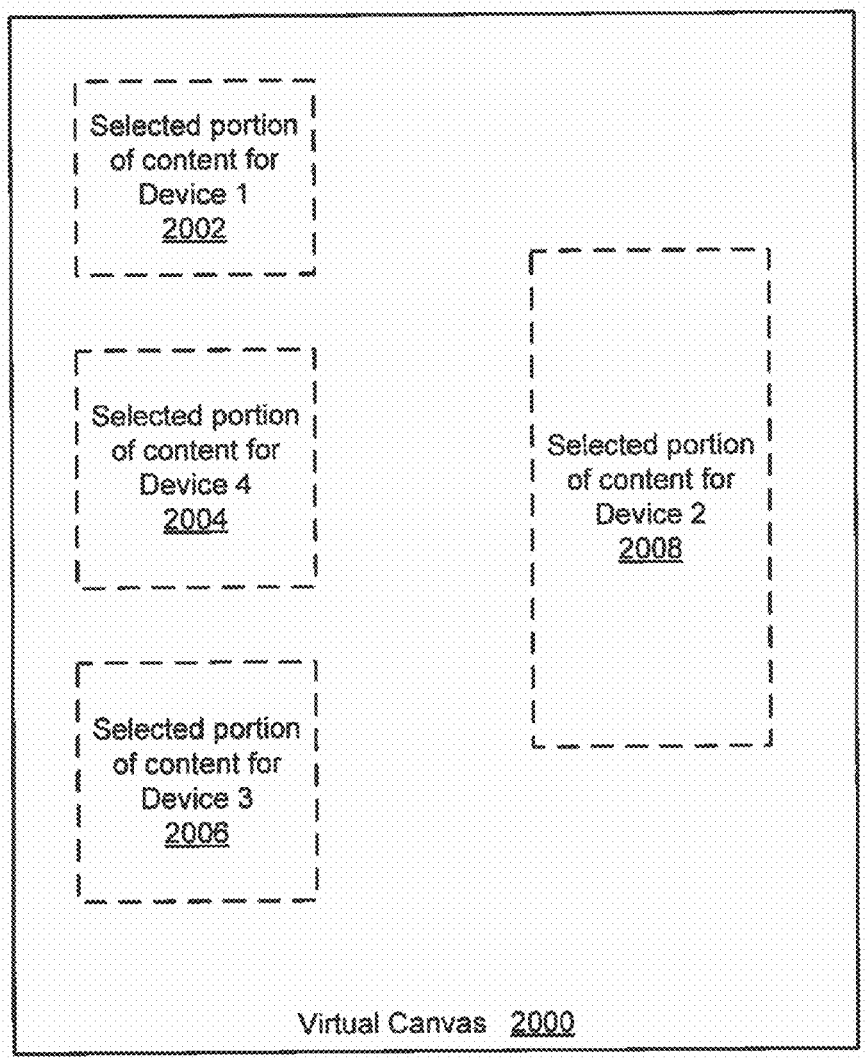
FIGS. 20A and 20B show examples of populating data from a virtual canvas onto multiple devices in accordance with one or more embodiments of the invention.

FIG. 20A shows an example of display areas of four devices (Device 1, Device 2, Device 3, Device 4) which display content objects from the virtual canvas 2000. In one or more embodiments of the invention, the virtual canvas (2000) in FIG. 20A represents a virtual space of content, from which content object groups (2002, 2004, 2006, 2008) may be selected for display on each workspace device of a multi-device workspace. More specifically, all of the content from a file, including text and image data, is represented by the virtual canvas (2000) of FIG. 20A. This file may be, for example, multiple pages of an e-presentation (as described in FIG. 4 above) or a single page of notes. In one or more embodiments of the invention, the content object groups selected and displayed for each device each make up a portion of the virtual canvas. Each selection portion may be a portion of a single page, or may be portions of multiple pages when the content from an entire file is laid out across the virtual representation shown in FIG. 20A.

Further, in the example of FIG. 20A, devices 1, 3, and 4 have similar display areas, and thus, the selected content object groups may be displayed at the same zoom level and in the same orientation. Alternatively, device 2 has a different display area as compared to the other devices, and thus, may display the selected content object group (2008) at differing display characteristics than devices 1, 3, and 4.

In one or more embodiments of the invention, the "position" of the devices shown in FIG. 20A may be determined by the x,y quadrant of the top left corner of the display of each device, and the zoom level may be determined from 100% zoom. The x, y coordinates of the display of each workspace device may be stored in the workspace devices data structure of FIG. 11B.

As can be seen from the example of FIG. 20A, the content object groups displayed on each workspace device (2002, 2004, 2006, 2008) may constitute non-contiguous contiguous portions of the virtual canvas. Further, portions of the virtual canvas may not be selected for display on any of the devices in a multi-device workspace.

Figure 20B:
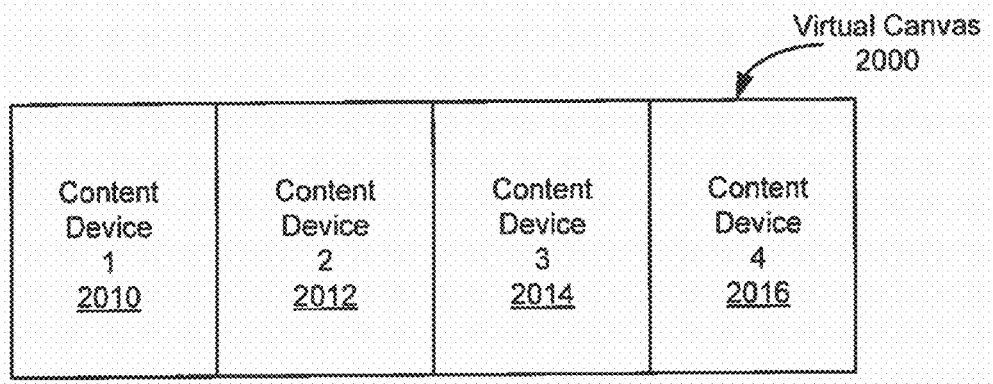

FIG. 20B shows the same virtual canvas (2000) as in FIG. 20A. In FIG. 20B, the content object groups (2010, 2012, 2014, 2016) displayed on each of the four devices display the virtual canvas (2000) in its entirety (all content in the file represented by the virtual canvas). More specifically, the content object groups of the virtual canvas (2000) are displayed as contiguous portions of the virtual canvas (2000). Thus, a single file is evenly distributed across the multi-device workspace in FIG. 20B, where each of the four devices show different content object groups (2010, 2012, 2014, 2016) in a contiguous manner. For example, FIG. 20B represents the example in which the file represented by the virtual canvas has four pages, and page 1 is displayed on device 1, page 2 is displayed on device 2, page 3 is displayed on device 3, and page 4 is displayed on device 4. Those skilled in the art will appreciate that the virtual canvas content may be evenly distributed across all of the multi-device workspace regardless of the number of pages or any other organization of the virtual canvas. The virtual canvas is divided evenly across the workspace devices, such that each workspace device displays a portion of the virtual canvas in a contiguous manner.

The following examples are described to illustration various applications of embodiments of the invention, and are not meant to limit the scope of the invention.

Consider a scenario in which a user previously was working on devices A and B. After a period of time has elapsed, the user logs into device C using the user's smartphone. A determination is then made about whether the new device should be added to an existing workspace that includes devices A and B. If the determination is positive (e.g., the determinations in steps 1808 and 1810 are both "YES"), then device C will be considered a third device in the existing multi-device device workspace. Alternatively, if the determination is negative (e.g., the determinations in steps 1808 and/or 1810 are "NO"), then device C will be considered a first device in a new multi-device workspace In another example, suppose a pair of devices are part of a multi-device workspace that only includes two devices. Device A is displaying a layout of a house and Device B is displaying other content. Assume that the user logs out of the first multi-device workspace and then logs into a third device (Device D) which is smaller than devices A and B. In this example assume that Device D becomes the first device in a new multi-device workspace. Further, assume for this example, that the existing virtual canvas for the user is selected for display in the new multi-device workspace. Because the size of the display area of Device D is less than the display area of Devices A and B, the workspace management system automatically selects a subset of the virtual canvas to display on Device D. Accordingly, in this example, only a portion of the house layout is displayed on Device D.

In another embodiment, the workspace management system does not specify the subset of the virtual canvas to display and leaves that decision to Device D or the user.

In another example, suppose a pair of devices are part of a multi-device workspace that only includes two devices. Device A is displaying a layout of a house and Device B is displaying other content, where both devices are oriented in a portrait orientation. Assume that the user logs out of the first multi-device workspace and then logs into a third device (Device D) which is smaller than devices A and B, where device D is in a landscape orientation. In this example assume that Device D becomes the first device in a new multi-device workspace. Further, assume for this example, that the existing virtual canvas for the user is selected for display in the new multi-device workspace. Because the size of the display area of Device D is less than the display area of Devices A and B and because the orientation of the new multi-device workspace is different than the existing multi-device workspace, the workspace management system automatically selects a subset of the virtual canvas to display on Device D. The selection of the portion of the virtual canvas to display takes into account both the size and the orientation of Device D. In another embodiment, the workspace management system does not specify the subset of the virtual canvas to display and leaves that decision to Device D or the user.

Figure 21A:
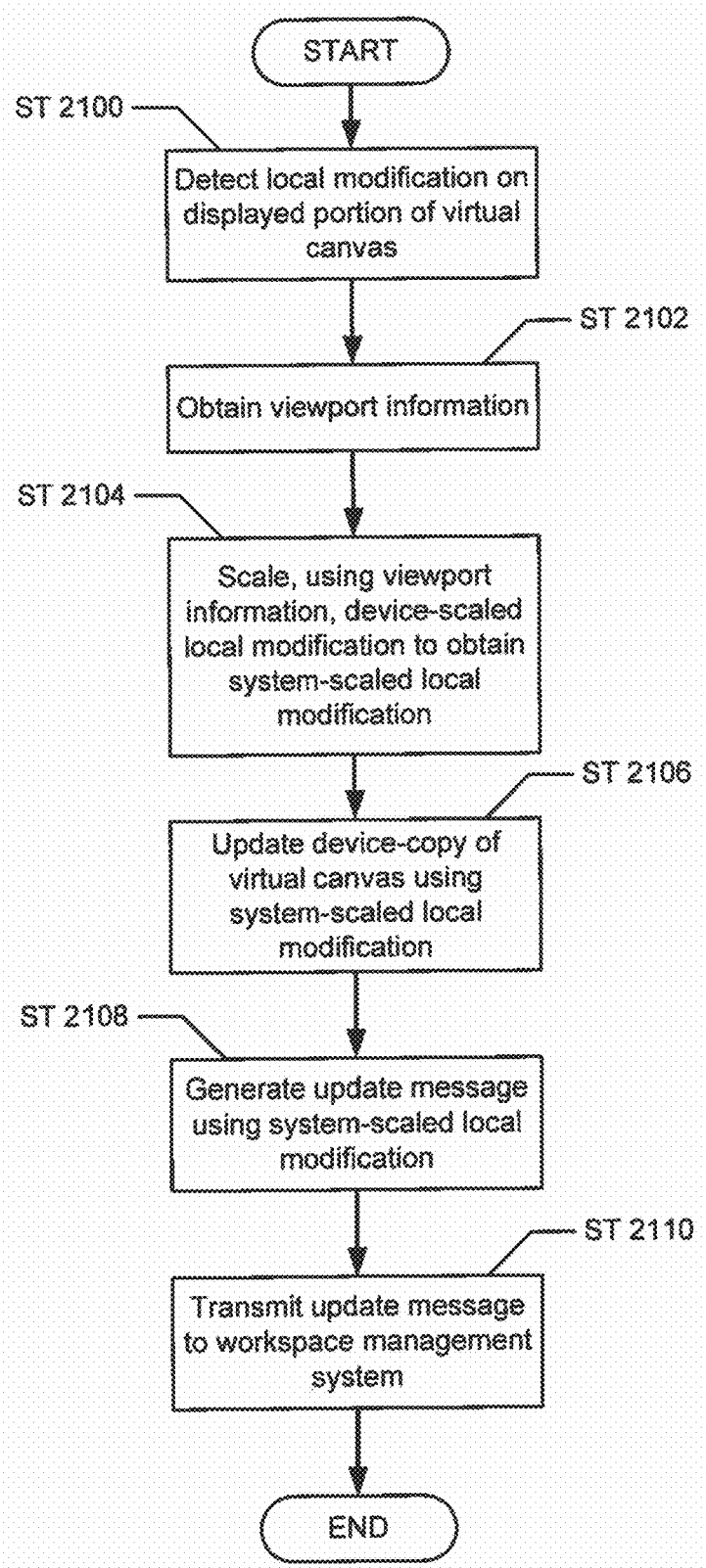
FIGS. 21A-21C show flowcharts in accordance with one or more embodiments of the invention.
Figure 21B:
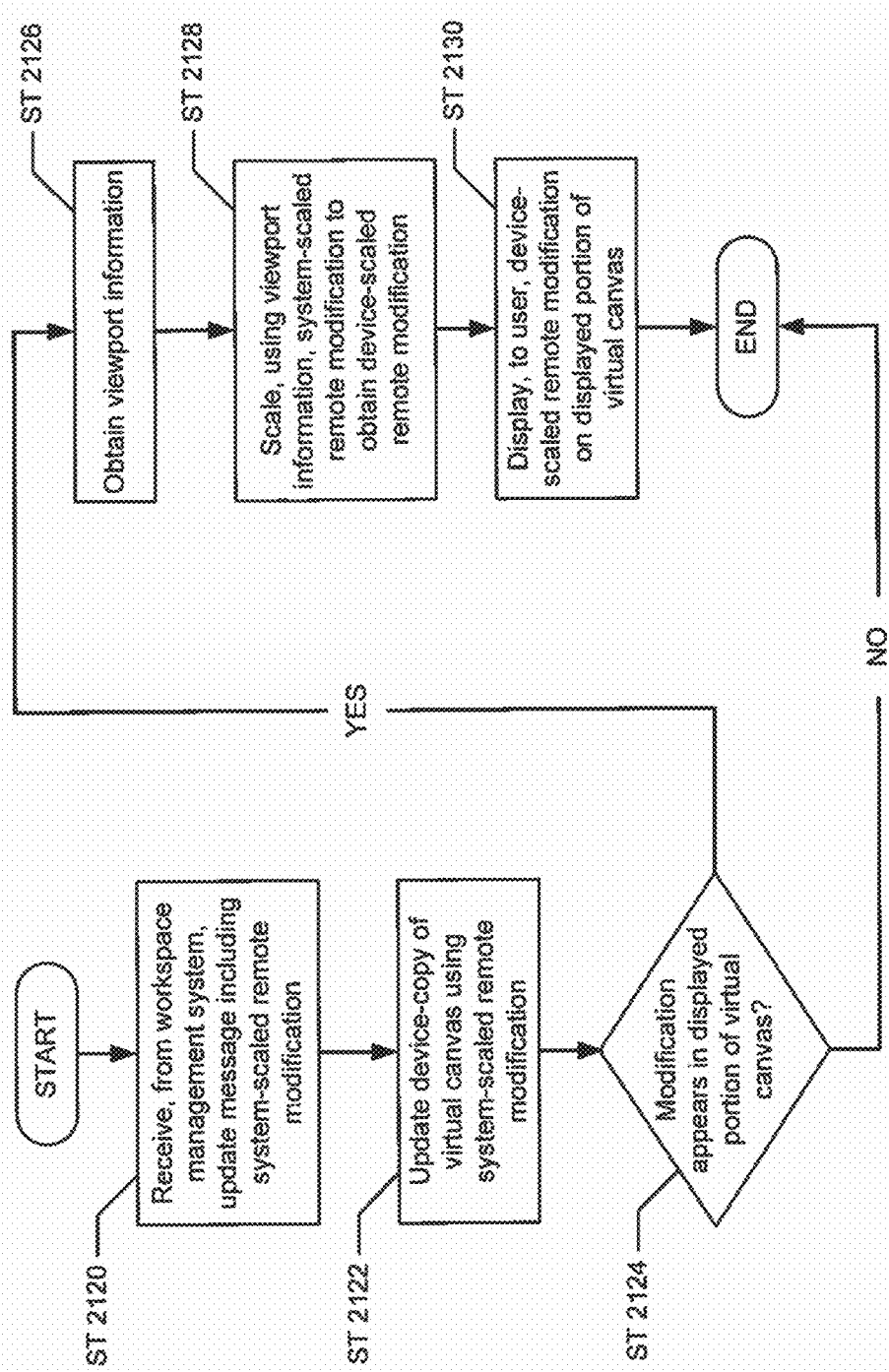
Figure 21C:
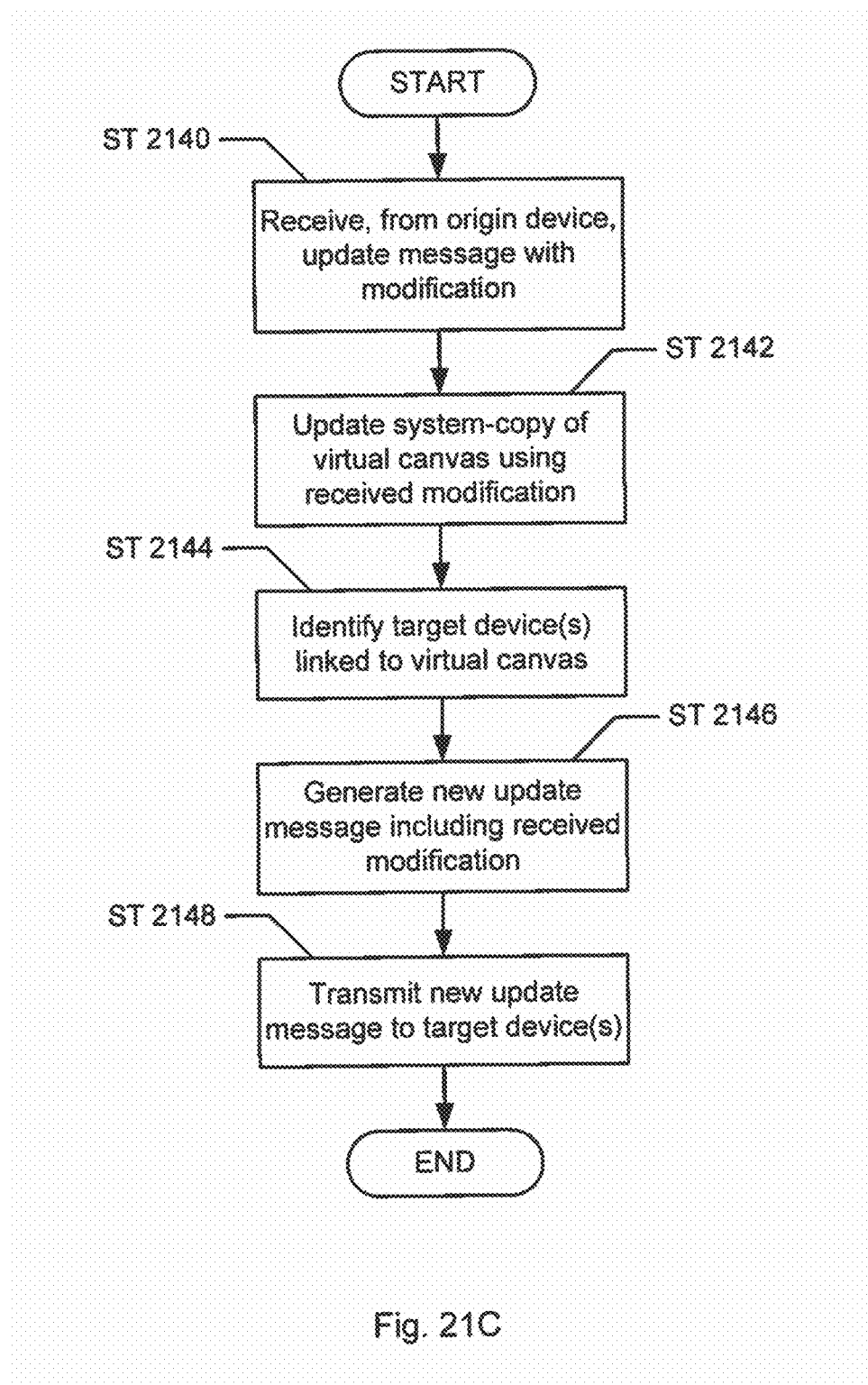

FIGS. 21A-21C show flowcharts in accordance with one or more embodiments of the invention. While the various steps in the following flowcharts are presented and described sequentially, on of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

FIG. 21A shows a flowchart that describes a method for updating a virtual canvas based on a local modification in accordance with one or more embodiments of the invention. In ST 2100, a local modification, on a displayed portion of a virtual canvas, is detected. In one embodiment of the invention, a local modification may refer to a change performed by a user interacting with a local device that may be a part of the multi-device workspace. Further, in one embodiment of the invention, the detecting of a local modification may result from determining that there is a difference in content between the displayed portion of the virtual canvas on the local device versus a recently stored device-copy of the virtual canvas. The comparison of content, potentially leading to a detection, may be specified via indication by the user (e.g., saving the active virtual canvas file) or through the performance of a recurrent computer process on the local device activating at predetermined time intervals (e.g., incremental updates). Further, the local modification may be detected by the workspace management system or the local device on which the change is made. Additionally, in one embodiment of the invention, content presented on the local device, including any local modifications, is subject to viewport information (discussed below) specified by the user on the local device.

In ST 2102, viewport information associated with the local device is obtained. In one embodiment of the invention, viewport information describes the perspective of the portion of the virtual canvas visible to a user and, thus, displayed on a device. Moreover, viewport information may be different for every device and is subject to the preferences of a user at any given time. For example, viewport information may be affected by the device display screen size, the device display screen orientation, and other device specific parameters. With this in mind, because viewport information may be particular to the device, in one embodiment of the invention, viewport information associated with a given device may be stored on the given device. In one embodiment of the invention, viewport information may include content scaling information (or a zoom factor which is applied to the portion of the virtual canvas displayed on a device). For example, viewport information for a particular device may be a zoom factor of 75%, indicating that the device is viewing the virtual canvas, or a portion of the virtual canvas, as 75% zoom. Additional and/or alternative information (e.g., window width, window length, orientation, aspect ratio, reference coordinates, etc.) may pertain relevance to viewport information without departing from the invention.

In ST 2104, using the viewport information (obtained in ST 2102), the device-scaled local modification (e.g., the local modification detected in ST 2100) is scaled to obtain a system-scaled local modification. As mentioned above, content pertaining to the portion of the virtual canvas displayed on a device may be subject to the viewport information specified by the user interacting with said device. As such, in one embodiment of the invention, the detected local modification, which is included amongst the content corresponding to the displayed portion of the virtual canvas on the local device, may exist presently at a scaling level dictated by viewport information associated with the local device. In one embodiment of the invention, a scaling level associated with a device may be referred as a device-scale level, whereas a scaling level associated with the system may be referred as the system-scale level. In one embodiment of the invention, copies of the virtual canvas, in its entirety, stored on each device (concurrently accessing the virtual canvas) and the workspace management system are stored at a system-scale level for uniformity. Subsequently, before updating a device-copy and/or system-copy of the virtual canvas using any changes detected on a displayed portion of the virtual canvas on any device, those changes (initially associated with a device-scale level) need to be converted to the system-scale level. In one embodiment of the invention, any device-scale level, associated with any particular device, may be equal or different to the system-scale level at any given time (depending on the interactive requirements of the user of a device). In one embodiment of the invention, the system-scale level remains constant and may typically be set at a zoom factor of, for example, 100%.

In ST 2106, using the system-scaled local modification (obtained in ST 2104), the device-copy of the virtual canvas, on the local device, is updated. Specifically, in one embodiment of the invention, the workspace management system may send the system-scaled local modification to all devices in the multi-device workspace, and each device may refresh their displayed portion of the virtual canvas, regardless of whether the affected area of the canvas where the modification occurred affects the display of that particular device. Alternatively in one or more embodiments, only the device's display of the virtual canvas that is affected by the local modification may refresh their display based on the system-scaled local modification sent to the device. In yet another embodiment, the user of a device may be prompted to trigger a refresh of the display of the virtual canvas on a particular device, where the user determines that the local modification occurred in a display area that does affect the display of the virtual canvas on that particular device. Those skilled in the art will appreciate that either the workspace management system or the local device may make the determination of whether the local device is affected by the system-scaled location modification by comparing content from before the local modification and after.

In ST 2108, an update message, using the system-scaled local modification, is generated. The update message includes the modification made in ST 2100-ST 2106. In one embodiment of the invention, copies of the virtual canvas on each of the devices and the workspace management system are to be as consistent with one another at any given time. Hence, when a device-copy of the virtual canvas is updated (incrementally or otherwise) because of changes done to a portion of the virtual canvas, by a user interacting with any given local device, copies of the virtual canvas on other devices (e.g., remote devices), as well as the system-copy on the workspace management system, may also be updated. Following generation of the message, in ST 2110, the update message is transmitted to the workspace management system.

FIG. 21B shows a flowchart that describes a method for updating a virtual canvas based on a remote modification in accordance with one or more embodiments of the invention. In ST 2120, an update message that includes a system-scaled remote modification is received from the workspace management system. In one embodiment of the invention, a remote modification refers to a change performed by a user interacting with a remote device (e.g., a device different to a local device, which may also be concurrently accessing the virtual canvas). In one embodiment of the invention, the received update message may have resulted from the remote device performing the steps discussed above corresponding to FIG. 21A upon detecting a modification on a portion of the virtual canvas displayed on the remote device. Further, as discussed above also, prior to updating the device-copy of the virtual canvas on the remote device, as well as generating and uploading the update message, the remote modification may have undergone scaling conversion, using viewport information associated with the remote device, thereby converting the remote modification from a device-scale level (particular to the remote device) to the system-scale level.

In ST 2122, the device-copy of the virtual canvas, on the local device, is updated using the system-scaled remote modification. Following this, in ST 2124, a determination is made whether or not (at least a portion of) the remote modification appears in the portion of the virtual canvas displayed on the local device. If it is determined that the remote modification does appear on the displayed portion of the virtual canvas on the local device, the process proceeds to ST 2126; otherwise, the process ends. As described above, in alternate embodiments, even if the remote modification does not appear on the displayed portion of the virtual canvas, the local device may refresh the virtual device display content nonetheless.

In ST 2126, having determined that the remote modification appears in the displayed portion of the virtual canvas on the local device, viewport information associated with the local device (and subsequently stored on the local device) is obtained. In one embodiment of the invention, determining that the remote modification appears in the displayed portion of the virtual canvas on the local device may include: (i) obtaining metadata, included in the update message, associated with the remote modification—the metadata disclosing information to which area the remote modification may be found on the virtual canvas; (ii) obtaining metadata, stored on the local device, associated with the displayed portion of the virtual canvas on the local device—the metadata disclosing information to which area of the virtual canvas is currently displayed on the local device; (iii) comparing the metadata (e.g., the disclosed virtual canvas area information) associated with the remote modification against the metadata (e.g., the disclosed virtual canvas area information) associated with the portion of the virtual canvas displayed on the local device; and (iv) concluding that at least some overlap between the two aforementioned areas of the virtual canvas exist.

In ST 2128, using the viewport information associated with the local device (obtained in ST 2126), the system-scaled remote modification undergoes scaling conversion to obtain a device-scaled remote modification. In one embodiment of the invention, as discussed above, copies of the virtual canvas, on every device concurrently accessing the virtual canvas, and on the workspace management system, are stored at the set system-scale level. Henceforth, outgoing updates from, and incoming updates to, any given device is represented at the system-scale level. Further, content pertaining to the portion of virtual canvas displayed on the local device may or may not be at the system-scale level when the update message is received. As such, in the case that the content displayed on the local device is at a device-scale level, where the device-scale level is different than the system-scale level, the remote modification requires adjustment (e.g., scaling conversion) in accordance with the viewport information associated (or the perspective of the content visible to the user interacting) with the local device.

In ST 2130, post-conversion, the device-scaled remote modification (or at least the portion of the remote modification overlapping the user's perspective) is displayed/presented, on the portion of the virtual canvas displayed on the local device, to the user interacting with the local device.

FIG. 21C shows a flowchart that describes a method for disseminating updates to appropriate devices in accordance with one or more embodiments of the invention. In one embodiment of the invention, the steps described hereafter refer to actions performed after the method disclosed in FIG. 21A and before the method disclosed in FIG. 21B. In view of this, in ST 2140, an update message that includes a modification is received, by the workspace management system, from an origin device. As discussed above with respect to FIG. 21A, the received modification may be represented at a system-scale level.

In ST 2142, using the received modification, the system-copy (or the copy stored on the workspace management system) of the virtual canvas is updated. In one embodiment of the invention, the system-copy of the virtual canvas may be retained at the system-scale level, as does the device-copies stored on each device concurrently accessing the virtual canvas. Subsequently, scaling conversion of the received modification, at the workspace management system, is unnecessary.

In ST 2144, one or more target device(s), which may be linked to the virtual canvas, are identified. The target devices may be the other devices that make up the multi-device workspace as described above. In one embodiment of the invention, the workspace management system may manage one or more virtual canvas(es). In such an embodiment, the workspace management system may also track the one or more device(s) concurrently accessing (or linking to) a particular virtual canvas. This tracking information may be retrieved from the workspace records and/or user activity records stored on the workspace management system (see e.g., FIGS. 11A and 11B). In one embodiment of the invention, upon receiving the update message from the origin device, the workspace management system may refer to the user activity record corresponding to the origin device to identify the virtual canvas identifier (see e.g., 1116 in FIG. 11B) associated with the received modification. Using this obtained virtual canvas identifier, the workspace management system may proceed in the identification of target devices by searching for devices corresponding to user activity records that include a virtual canvas identifier that matches the obtained virtual canvas identifier (associated with the received modification).

In ST 2146, for each target device identified in ST 2144, which is linked to the virtual canvas associated with the received modification, a new update message that includes the received modification is generated. As discussed above, the received modification is not subject to scaling conversion while at the workspace management system, and consequently, the new update message includes the received modification at the system-scale level. Lastly, in ST 2148, the new update message is transmitted (or disseminated) towards the target device(s) identified in ST 2144.

The following examples are for explanatory purposes only and are not intended to limit the scope of the invention.

FIGS. 22A-22D show an example in accordance with one or more embodiments of the invention. As a backdrop to this example, consider a scenario in which four devices (Device 1, Device 2, Device 3, and Device 4) are concurrently accessing a virtual canvas. In one embodiment of the invention, the four devices may be associated with a single multi-device workspace, such that all devices interact with a single user. In another embodiment of the invention, the four devices may be associated with a plurality (e.g., two to four) of multi-device workspaces, such that, potentially, each device may interact with a different user.

Figure 22A:
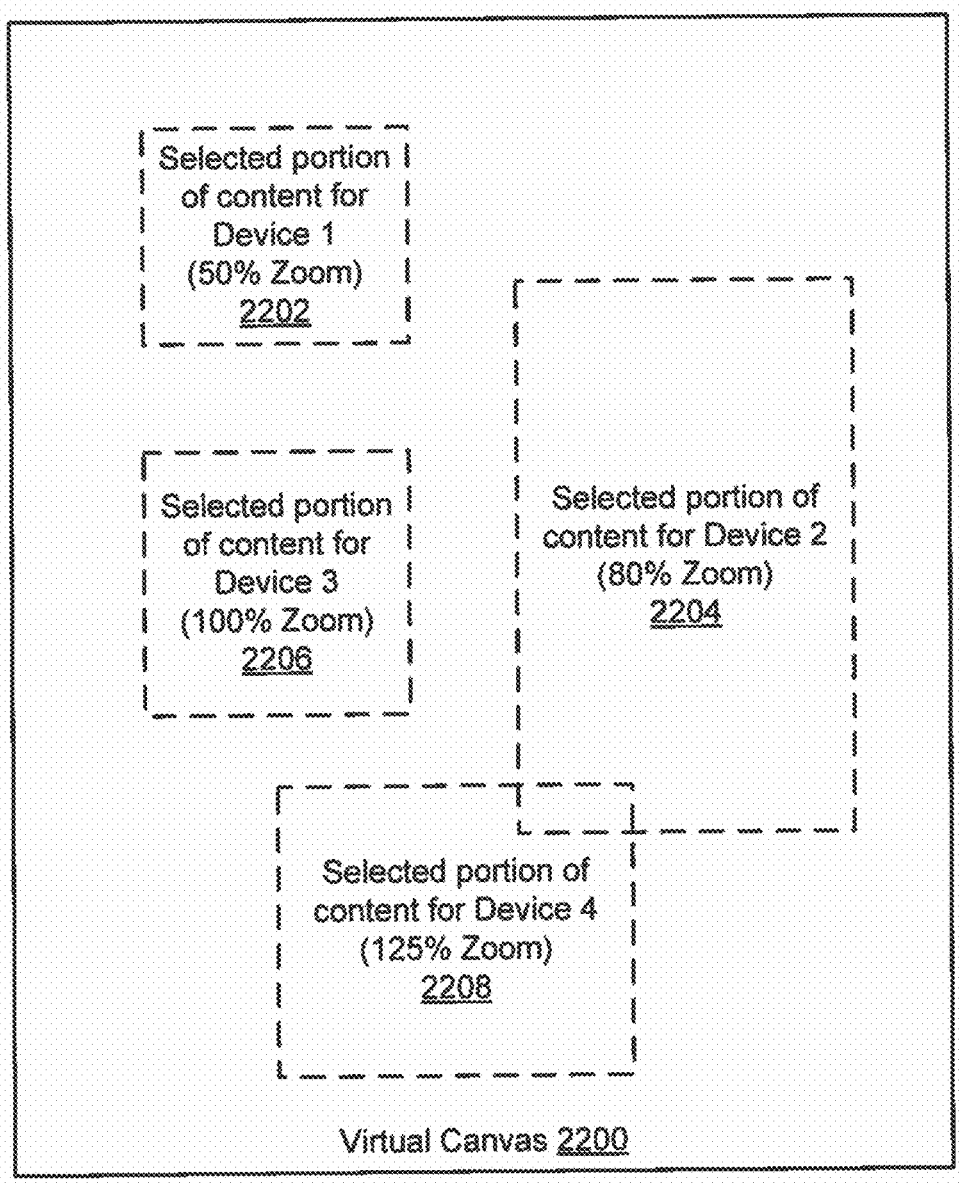

FIG. 22A shows example display areas corresponding to the four aforementioned devices, which display content from the virtual canvas (2200). In one embodiment of the invention, the virtual canvas represents a virtual space of content, from which content (e.g., content object groups (2202, 2204, 2206, 2208)) may be selected for display on each device linked to the virtual canvas. The virtual canvas, as presented, contains all content in a file, including text and image data. This file may be, for example, multiple pages of an e-presentation (as described in FIG. 4 above) or a single page of notes. In one embodiment of the invention, the content object groups, selected and displayed for each device, each make up a portion of the virtual canvas. As such, each selected portion may be a portion of a single page, or may be portions of multiple pages when the content from an entire file is laid out across the virtual representation shown in FIG. 22A. Moreover, in one embodiment of the invention, the selected portions of content displayed on each device may constitute non-contiguous portions (e.g., 2202, 2204, 2206, 2208) of the virtual canvas (2200). Substantively, portions of the virtual canvas may not be selected for display on any of the devices.

In the presented example display areas, except for minor overlapping between the display areas of Device 2 and Device 4, each of the devices predominantly encompass different portions of the virtual canvas. Additionally, as discussed above, each device may display a portion of the virtual canvas, to a user, at respective device-scale levels. As shown, for example, the selected portion of content displayed on Device 1 is subjected to a zoom factor of 50%. In one embodiment of the invention, each device-scale level (or zoom factor) may be relative to the system-scale level. Thus, the selected portion of content displayed on Device 1 may be presented, to a user, at half the scale that which content in the virtual canvas is stored on each of the devices and the workspace management system.

FIGS. 22B-22D show the selected portions of content displayed on each of the devices subjected to the device-scale levels presented in FIG. 22A. Proceeding with the scenario, suppose the user interacting with Device 4 performs a modification (2218) within the respective displayed portion of the virtual canvas (2216B), which is subjected to the device-scale level specified in the viewport information associated with Device 4. According to embodiments of the invention, Device 4 detects said modification and subsequently converts, using viewport information associated with (and stored on) the device, the modification from a device-scale level (e.g., 125%) to the system-scale level (e.g., 100%). Using the obtained system-scaled modification (not shown), Device 4 then updates the device-copy of the virtual canvas. After updating the device-copy, Device 4 continues towards generating an update message, which includes the system-scaled scaled modification, and transmits the update message to the workspace management system.

From the other side of the transmission, at this point, the workspace management system receives the update message from the origin device (or Device 4). Subsequently, using the system-scaled modification, included in the update message, the workspace management system updates the system-copy of the virtual canvas. Following this, the workspace management system identifies target devices (Device 1, Device 2, and Device 3) that are linked to the virtual canvas to which the modification is associated. The workspace management system, having identified the target devices, then generates a new update message that includes the system-scaled modification, and transmits the new update message towards the target devices.

Eventually, each of the target devices of the multi-device workspace (identified by the workspace management system) receives the new update message. Upon receiving the new update message, each of the target devices update their device-copy of the virtual canvas using the system-scaled modification included in the new update message. From here, the target devices perform a determination as to whether or not the received modification appears in their selected portions of content displayed to a user. Looking back at FIG. 22A, Device 1 and Device 3 determine that the received modification does not appear in their respective selected portions of content being displayed since the display areas corresponding to Device 1 and Device 3 are mutually exclusive (e.g., shares no overlapping area) to the display area associated with Device 4 (or the device from which the modification originated). Device 2, however, determines that the received modification (or at least a portion of the received modification) does appear in its respective selected portion of content being displayed. More specifically, according to the example, the overlapping area of the display areas, pertaining to Device 4 and Device 2, correspond to the area of the display area of Device 4 whereupon the modification was performed. Based on the determination, Device 2 converts the scaling of the received modification to coincide with the scaling of content being displayed to the user. In other words, Device 2, using viewport information associated with (and stored on) itself, adjusts the received modification from the system-scale level (e.g., 100%) to the device-scale level (e.g., 80%) specified in the viewport information. This process results in the presentation of the received modification (2220) (at the device-scale level associated with Device 2) (2212B) at the portion of the display area of Device 2 that overlaps the portion of the display area of Device 4. The modification (2220) appears smaller when presented via Device 2 since content portrayed through Device 2 corresponds to a 80% device-scale level, whereas content portrayed through Device 4 corresponds to a 125% device-scale level.

Those skilled in the art will appreciate that in one or more embodiments, each multi-device workspace device that receives the update message may update/refresh their local display of the virtual canvas regardless of whether the device shares an overlapping area with the updated portion of the virtual canvas. Moreover, in another embodiment, the workspace management system may make the determination as to which multi-workspace device shares overlapping content with the updated portion of the absolute canvas, and only send the update message to that device.

FIGS. 23A-23D show another example in accordance with one or more embodiments of the invention. With respect to the following example, consider a scenario in which four devices (Device 1, Device 2, Device 3, and Device 4) are concurrently accessing another virtual canvas. In one embodiment of the invention, the four devices may be associated with a single multi-device workspace, such that all devices interact with a single user. In another embodiment of the invention, the four devices may be associated with a plurality (e.g., two to four) of multi-device workspaces, such that, potentially, each device may interact with a different user.

Figure 23A:
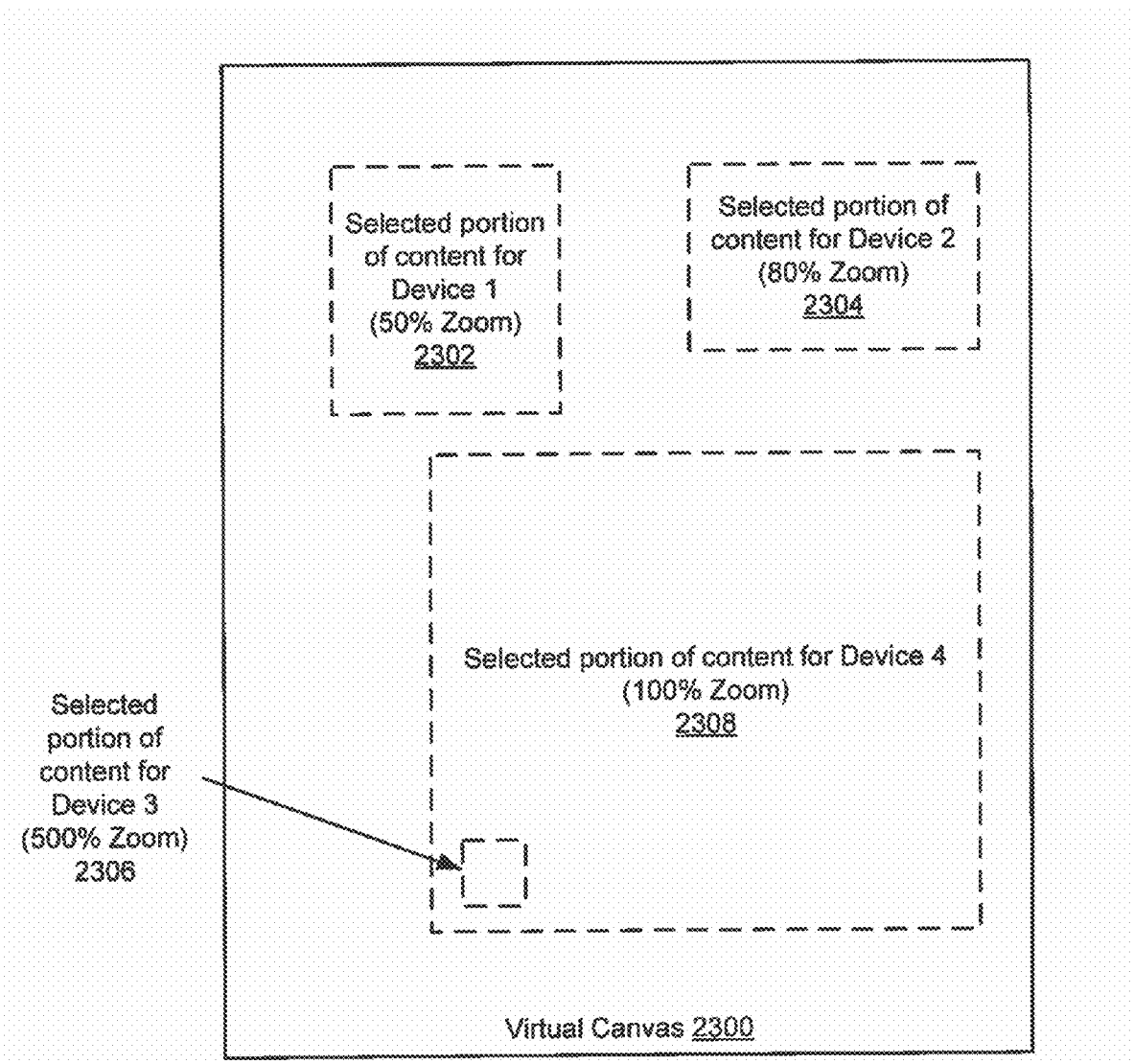
FIGS. 23A-23D show an example in accordance with one or more embodiments of the invention.

FIG. 23A, similar to FIG. 22A discussed above, shows example display areas corresponding to the four aforementioned devices, which display content from the virtual canvas (2300). Similarly in addition, the virtual canvas represents a virtual space of content, from which content (e.g., content object groups (2302, 2304, 2306, 2308)) may be selected for display on each device linked to the virtual canvas. In the example, note that the display area of Device 3 is enclosed by the display area of Device 4.

Figure 23B:
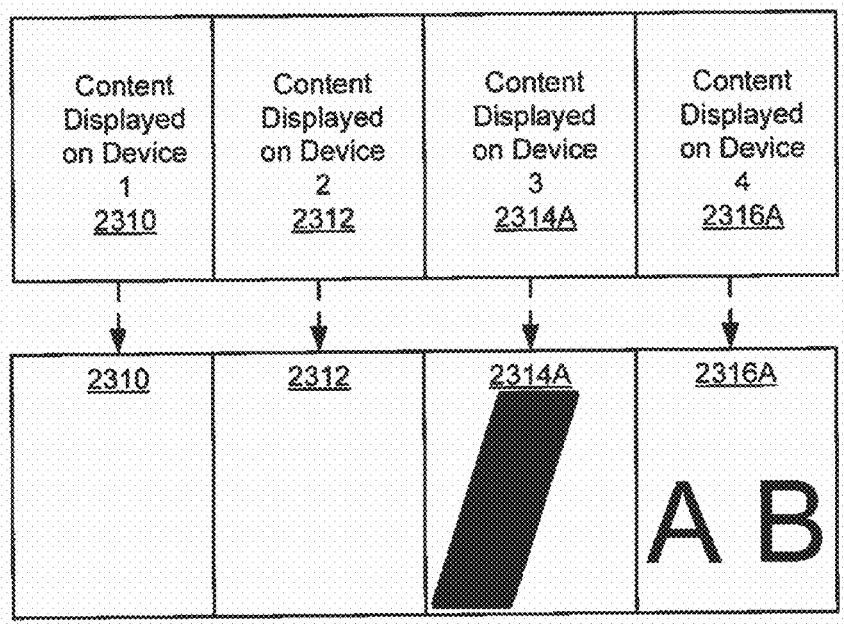
Figure 23C:
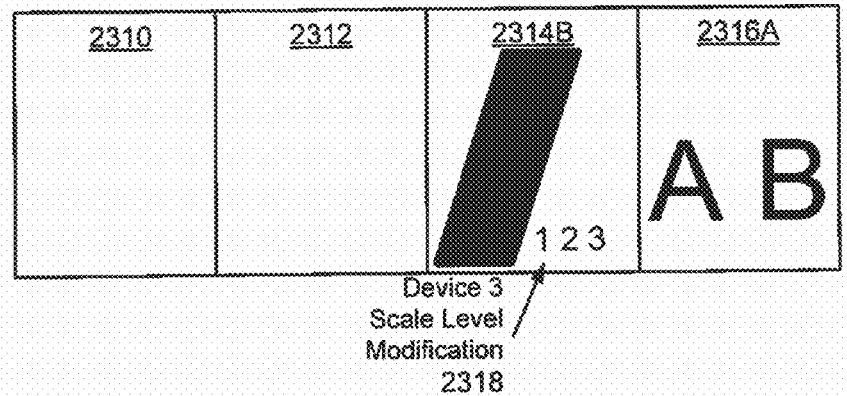
Figure 23D:
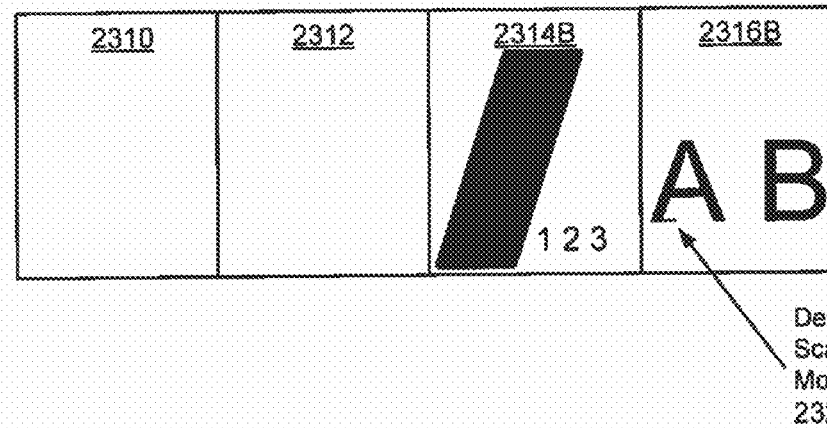

FIGS. 23B-23D show the selected portions of content displayed on each of the devices subjected to the device-scale levels presented in FIG. 23A. As depicted, the selected portion of content displayed on Device 3 (2314A) represents a subset (e.g., a small area located near the left-bottom corner) of the selected portion of content displayed on Device 4 (2316A). Following the scenario, suppose the user interacting with Device 3 performs a modification (2318) on the selected portion of content (2314B) displayed on Device 3. Subsequently, through embodiments of the invention (discussed above), the aforementioned modification (2318) is rendered as the modification at the device-scale level associated with Device 4 (2320). The modification (presented to the user on Device 4) (2320) appears substantially reduced in size in response to the device-scale level of Device 3 (e.g., 500%) being substantially larger than the device-scale level associated with Device 4 (e.g., 100%).

Figure 24:
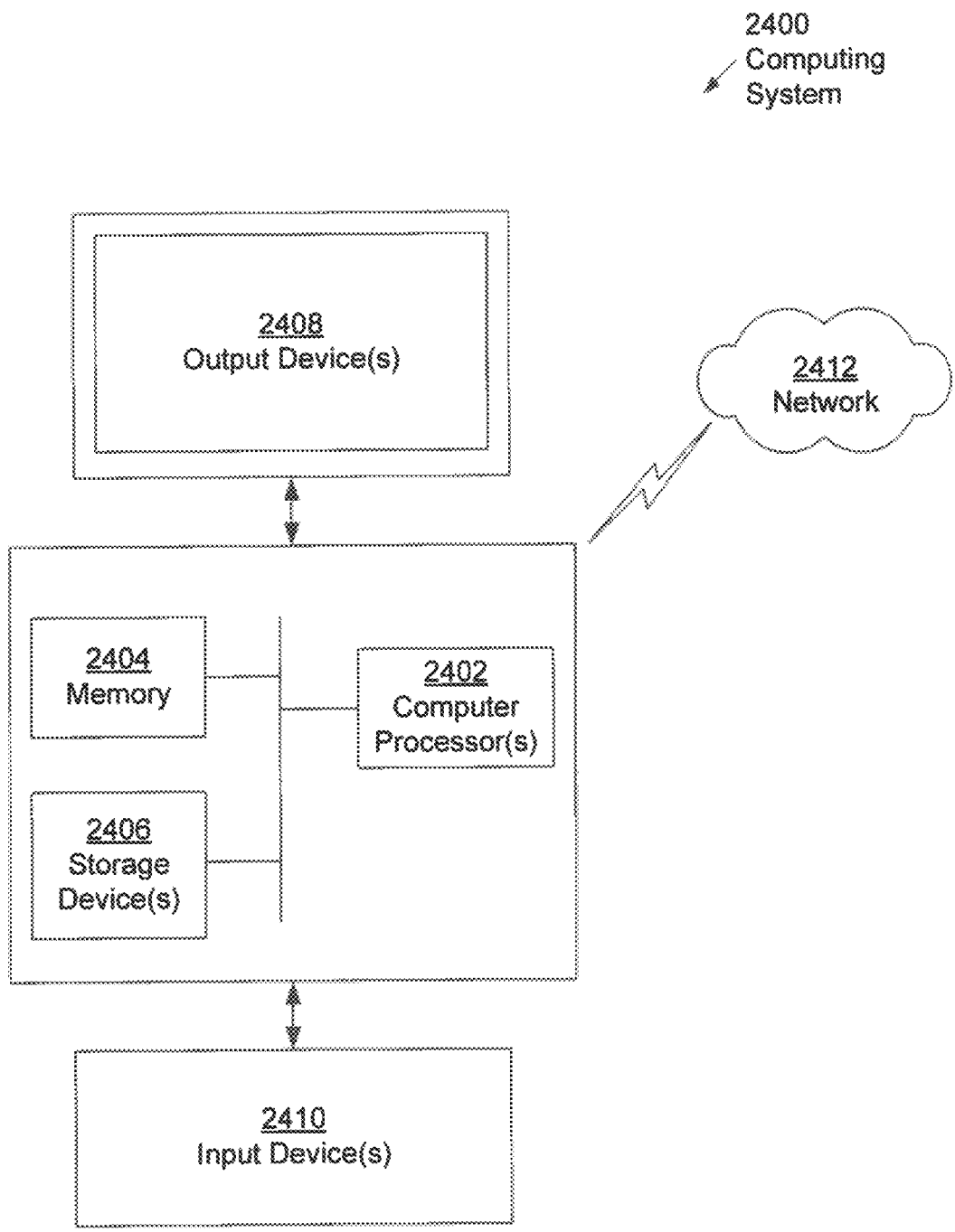
FIG. 24 shows a computing system in accordance with one or more embodiments of the invention.

Embodiments of the invention may be implemented on a computing system. Any combination of mobile, desktop, server, embedded, or other types of hardware may be used. For example, as shown in FIG. 24, the computing system (2400) may include one or more computer processor(s) (2402), associated memory (2404) (e.g., random access memory (RAM), cache memory, flash memory, etc.), one or more storage device(s) (2406) (e.g., a hard disk, an optical drive such as a compact disk (CD) drive or digital versatile disk (DVD) drive, a flash memory stick, etc.), and numerous other elements and functionalities. The computer processor(s) (2402) may be an integrated circuit for processing instructions. For example, the computer processor(s) may be one or more cores, or micro-cores of a processor. The computing system (2400) may also include one or more input device(s) (2410), such as a touchscreen, keyboard, mouse, microphone, touchpad, electronic pen, or any other type of input device. Further, the computing system (2400) may include one or more output device(s) (2408), such as a screen (e.g., a liquid crystal display (LCD), a plasma display, touchscreen, cathode ray tube (CRT) monitor, reflective display, projector, or other display device), a printer, external storage, or any other output device. One or more of the output device(s) may be the same or different from the input device(s). The computing system (2400) may be connected to a network (2412) (e.g., a local area network (LAN), a wide area network (WAN) such as the Internet, mobile network, or any other type of network) via a network interface connection (not shown). The input and output device(s) may be locally or remotely (e.g., via the network (2412)) connected to the computer processor(s) (2402), memory (2404), and storage device(s) (2406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (2400) may be located at a remote location and connected to the other elements over a network (2412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for updating content on devices, comprising:
   detecting a local modification on a device, wherein the local modification is associated with a portion of a locally stored copy of a virtual canvas, wherein the portion of the locally stored copy of the virtual canvas is displayed on the device at a devicescale level;
   converting the local modification to a second local modification by scaling the local modification from the device-scale level to a system-scale level; updating, using the second local modification, the locally stored copy of the virtual canvas;
   generating a first update message comprising the second local modification;
   transmitting the first update message to a workspace management system;
   receiving, from the workspace management system, a second update message comprising
   a remote modification at the system-scale level: updating, using the remote modification, the locally stored copy of the virtual canvas;
   making a first determination that at least a portion of the remote modification is associated with the portion of the locally stored copy of the virtual canvas that is displayed on the device;
   obtaining, based on the first determination, viewport information associated with the device, wherein the viewport information specifies at least the device-scale level;
   converting, using the viewport information, at least the portion of the remote modification to a second remote modification by scaling at least the portion of the remote modification from the system-scale level to the device-scale level; and
   displaying at least the second modification on the device.

2. The method of claim 1, wherein the device is one of a plurality of devices in the workspace.

3. The method of claim 2, wherein a source of the remote modification is a second device of the plurality of devices in the workspace.

4. The method of claim 1, wherein the device is one of a plurality of devices concurrently accessing the virtual canvas.

5. The method of claim 4, wherein a source of the remote modification is a second device of the plurality of devices.

6. The method of claim 1, wherein the system-scale level is greater than the device-scale level.

7. The method of claim 1, wherein the system-scale level is different than the device-scale level.

8. The method of claim 1, wherein updating the locally stored copy of the virtual canvas comprises storing an incremental update on the device, wherein the incremental update comprises the second local modification.

9. The method of claim 1, wherein the device is an e-flipchart apparatus.

10. The method of claim 1, wherein the workspace management system comprises a system copy of the virtual canvas.

11. A non-transitory computer readable medium comprising instructions, which when executed by a processor, performs a method, the method comprising:
    detecting a local modification on a device, wherein the local modification is associated with a portion of a locally stored copy of a virtual canvas, wherein the portion of the locally stored copy of the virtual canvas is displayed on the device at a device-scale level;
    converting the local modification to a second local modification by scaling the local modification from the device-scale level to a system-scale level; updating, using the second local modification, the locally stored copy of the virtual canvas;
    generating a first update message comprising the second local modification;
    transmitting the first update message to a workspace management system;
    receiving, from the workspace management system, a second update message comprising
    a remote modification at the system-scale level: updating, using the remote modification, the locally stored copy of the virtual canvas;

making a first determination that at least a portion of the remote modification is associated with the portion of the locally stored copy of the virtual canvas that is displayed on the device;

obtaining, based on the first determination, viewport information associated with the device, wherein the viewport information specifies at least the device-scale level;

converting, using the viewport information, at least the portion of the remote modification to a second remote modification by scaling at least the portion of the remote modification from the system-scale level to the device-scale level; and displaying at least the second modification on the device.

12. The non-transitory computer readable medium of claim 11, wherein the device is one of a plurality of devices in the workspace.

13. The non-transitory computer readable medium of claim 12, wherein a source of the remote modification is a second device of the plurality of devices in the workspace.

14. The non-transitory computer readable medium of claim 11, wherein the device is one of a plurality of devices concurrently accessing the virtual canvas.

15. The non-transitory computer readable medium of claim 14, wherein a source of the remote modification is a second device of the plurality of devices.

16. The non-transitory computer readable medium of claim 11, wherein the system-scale level is greater than the device-scale level.

17. The non-transitory computer readable medium of claim 11, wherein the system-scale level is different than the device-scale level.

18. The non-transitory computer readable medium of claim 11, wherein updating the locally stored copy of the virtual canvas comprises storing an incremental update on the device, wherein the incremental update comprises the second local modification.

19. The non-transitory computer readable medium of claim 11, wherein the device is an e-flipchart apparatus.

20. The non-transitory computer readable medium of claim 11, wherein the workspace management system comprises a system copy of the virtual canvas.

* * * * *